(12) United States Patent
Mitani

(10) Patent No.: US 11,973,929 B2
(45) Date of Patent: Apr. 30, 2024

(54) IMAGE DISPLAY APPARATUS

(71) Applicant: SONY GROUP CORPORATION, Tokyo (JP)

(72) Inventor: Satoshi Mitani, Tokyo (JP)

(73) Assignee: Sony Group Corporation, Tokyo (JP)

( * ) Notice: Subject to any disclaimer, the term of this patent is extended or adjusted under 35 U.S.C. 154(b) by 179 days.

(21) Appl. No.: 17/771,174

(22) PCT Filed: Oct. 22, 2020

(86) PCT No.: PCT/JP2020/039677
§ 371 (c)(1),
(2) Date: Apr. 22, 2022

(87) PCT Pub. No.: WO2021/085287
PCT Pub. Date: May 6, 2021

(65) Prior Publication Data
US 2022/0385885 A1 Dec. 1, 2022

(30) Foreign Application Priority Data

Oct. 31, 2019 (JP) ................................. 2019-198429

(51) Int. Cl.
*H04N 13/351* (2018.01)
*G02B 5/32* (2006.01)
(Continued)

(52) U.S. Cl.
CPC ............. *H04N 13/351* (2018.05); *G02B 5/32* (2013.01); *G02B 30/26* (2020.01); *G03B 35/20* (2013.01);
(Continued)

(58) Field of Classification Search
CPC .. H04N 13/351; H04N 13/395; H04N 13/302; G02B 30/26; G02B 5/32; G03B 35/20
(Continued)

(56) References Cited

U.S. PATENT DOCUMENTS

| 6,141,034 A | 10/2000 | McCutchen |
| 11,681,092 B2 * | 6/2023 | Karafin .................. G06F 3/011 359/742 |

(Continued)

FOREIGN PATENT DOCUMENTS

| GB | 2570903 A | 8/2019 |
| JP | 2005-017894 | 1/2005 |

(Continued)

OTHER PUBLICATIONS

International Search Report and Written Opinion prepared by the Japan Patent Office dated Dec. 28, 2020, for International Application No. PCT/JP2020/039677, 2 pgs.

*Primary Examiner* — Frantz B Jean
(74) *Attorney, Agent, or Firm* — Sheridan Ross PC

(57) ABSTRACT

An image display apparatus including one or more virtual-image screens, a display section, and a display control unit. The one or more virtual-image screens are arranged to cover at least a part of a periphery of a predetermined axis, display a virtual image of a projected image by using the predetermined axis as a basis, and are transparent. The display section has one or more display surfaces that display a plurality of viewpoint images in mutually different directions and project the plurality of displayed viewpoint images onto the one or more virtual-image screens, respectively, the plurality of viewpoint images being images of a display target as viewed from mutually different directions. The display control unit displays, a virtual image of the display target that is visible from a second direction extending toward the predetermined axis from the observation point.

17 Claims, 19 Drawing Sheets

(51) Int. Cl.
*G02B 30/26* (2020.01)
*G03B 35/20* (2021.01)
*H04N 13/302* (2018.01)
*H04N 13/395* (2018.01)

(52) U.S. Cl.
CPC ......... *H04N 13/302* (2018.05); *H04N 13/395* (2018.05)

(58) Field of Classification Search
USPC .......................................................... 248/51
See application file for complete search history.

(56) References Cited

U.S. PATENT DOCUMENTS

| | | | |
|---|---|---|---|
| 2004/0227992 A1* | 11/2004 | Putilin | H04N 13/398 348/E13.05 |
| 2016/0048030 A1 | 2/2016 | Huang | |
| 2019/0374855 A1* | 12/2019 | Johnston | H04N 13/254 |
| 2020/0371378 A1* | 11/2020 | Makinen | G02B 30/50 |
| 2020/0413021 A1* | 12/2020 | Sato | G06T 19/00 |
| 2021/0133994 A1* | 5/2021 | Valli | G06T 19/006 |
| 2021/0136354 A1* | 5/2021 | Valli | G02B 27/017 |

FOREIGN PATENT DOCUMENTS

| | | |
|---|---|---|
| JP | 2008-176180 | 7/2008 |
| JP | 2008-224748 | 9/2008 |
| JP | 2017-152784 | 8/2017 |
| WO | WO-2019040484 A1 | 2/2019 |

\* cited by examiner

A

B

IMAGE DISPLAY APPARATUS

CROSS REFERENCE TO RELATED APPLICATIONS

This application is a national stage application under 35 U.S.C. 371 and claims the benefit of PCT Application No. PCT/JP2020/039677, having an international filing date of 22 Oct. 2020, which designated the United States, which PCT application claimed the benefit of Japanese Patent Application No. 2019-198429, filed 31 Oct. 2019, the entire disclosures of each of which are incorporated herein by reference.

TECHNICAL FIELD

The present technology relates to an image display apparatus that can be applied to stereoscopic display.

BACKGROUND ART

Conventionally, technologies for performing stereoscopic display that can be observed in multiple directions have been developed. For example, Patent Literature 1 has disclosed a stereoscopic display device that displays a stereoscopic video by using a polygonal pyramidal mirror. In this stereoscopic display device, the polygonal pyramidal mirror is disposed on a flat panel display by using its vertex side as the bottom. Frame images of the same object as viewed from different positions are displayed on the flat panel display, the frame images corresponding to the respective mirror surfaces. Accordingly, mirror images of the object as viewed from respective viewpoints in the entire periphery are displayed on the polygonal pyramidal mirror, such that the object can be stereoscopically viewed (specification paragraphs [0034], [0077], [0081], and [0084], FIG. 10, and the like in Patent Literature 1).

CITATION LIST

Patent Literature

Patent Literature 1: Japanese Patent Application Laid-open No. 2008-224748

DISCLOSURE OF INVENTION

Technical Problem

In the method disclosed in Patent Literature 1, it is necessary to increase the number of surfaces of the polygonal pyramidal mirror in order to improve the parallax (motion parallax) associated with the viewpoint's movement. In this case, increasing the number of surfaces reduces each mirror image size. Moreover, decreasing the number of surfaces of the polygonal pyramidal mirror increases the mirror image size while it reduces the motion parallax. Therefore, the sense of reality of the object stereoscopically displayed may be impaired.

In view of the above-mentioned circumstances, it is an object of the present technology to provide an image display apparatus capable of realizing stereoscopic display with an enhanced sense of reality.

Solution to Problem

In order to accomplish the above-mentioned object, an image display apparatus according to an embodiment of the present technology includes one or more virtual-image screens, a display section, and a display control unit.

The one or more virtual-image screens are arranged to cover at least a part of a periphery of a predetermined axis, display a virtual image of a projected image by using the predetermined axis as a basis, and are transparent.

The display section has one or more display surfaces that display a plurality of viewpoint images in mutually different directions and project the plurality of displayed viewpoint images onto the one or more virtual-image screens, respectively, the plurality of viewpoint images being images of a display target as viewed from mutually different directions.

The display control unit displays, in a first direction to see the display surface from an observation point around the virtual-image screen via the virtual-image screen, the viewpoint image that is a virtual image of the display target that is visible from a second direction extending toward the predetermined axis from the observation point.

In this image display apparatus, the one or more transparent virtual-image screens are arranged to cover at least the part of the periphery of the predetermined axis. Moreover, the one or more display surfaces that display the plurality of viewpoint images of the display target in the different directions are provided. The plurality of viewpoint images is projected onto the respective virtual-image screens. At that time, the viewpoint image that is the virtual image of the display target that is visible when seeing the predetermined axis from that observation point is displayed in the direction to see the display surface from the certain observation point via the virtual-image screen. Accordingly, stereoscopic display with an enhanced sense of reality can be realized.

The plurality of viewpoint images may be images of the display target as viewed from a direction shifted by a predetermined angular pitch. In this case, the display control unit may display the viewpoint image such that the virtual image of the display target is switched at the predetermined angular pitch as viewed from the observation point in accordance with movement of the observation point.

The virtual-image screen may reflect the viewpoint image projected from the display surface and display a virtual image of the viewpoint image. In this case, the display control unit may display, in the first direction, the viewpoint image obtained by flipping horizontally an image of the display target as viewed from the second direction.

The virtual-image screen may transmit the viewpoint image projected from the display surface and display a virtual image of the viewpoint image. In this case, the display control unit may display, in the first direction, the viewpoint image of the display target as viewed from the second direction.

The one or more virtual-image screens may include a plurality of virtual-image screens and configure a multi-screen by using the predetermined axis as a basis.

The virtual-image screen may be either one of a diffractive optical element and a half mirror.

The virtual-image screen may be either one of a reflection-type holographic optical element and a transmission-type holographic optical element.

The one or more virtual-image screens may be arranged to cover the entire periphery of the predetermined axis.

The one or more display surfaces may be arranged not to block a virtual image displayed by the one or more virtual-image screens.

The one or more display surfaces may include a plurality of display surfaces and configure a multi-screen display by using the predetermined axis as a basis.

Virtual images of the plurality of viewpoint images may be displayed such that center lines of virtual image planes of the virtual images overlap each other.

Virtual images of the plurality of viewpoint images may be displayed such that virtual image planes of the virtual images partially overlap each other or may be displayed such that virtual image planes of the virtual images are in contact with each other.

At least one of the virtual-image screen or the display surface may have a curved surface shape.

The display surface may be an image display surface of an anisotropic diffusion screen. In this case, the display section may have a plurality of projection units that projects images onto the anisotropic diffusion screen from mutually different directions.

The display surface may be an image display surface of a direct-view three-dimensional display.

The three-dimensional display may display the plurality of viewpoint images by any one method of a lenticular lens method, a lens array method, and a parallax barrier method.

MODE(S) FOR CARRYING OUT THE INVENTION

Hereinafter, embodiments according to the present technology will be described with reference to the drawings.

First Embodiment

[Basic Configuration of Image Display Apparatus]

Figure 1:
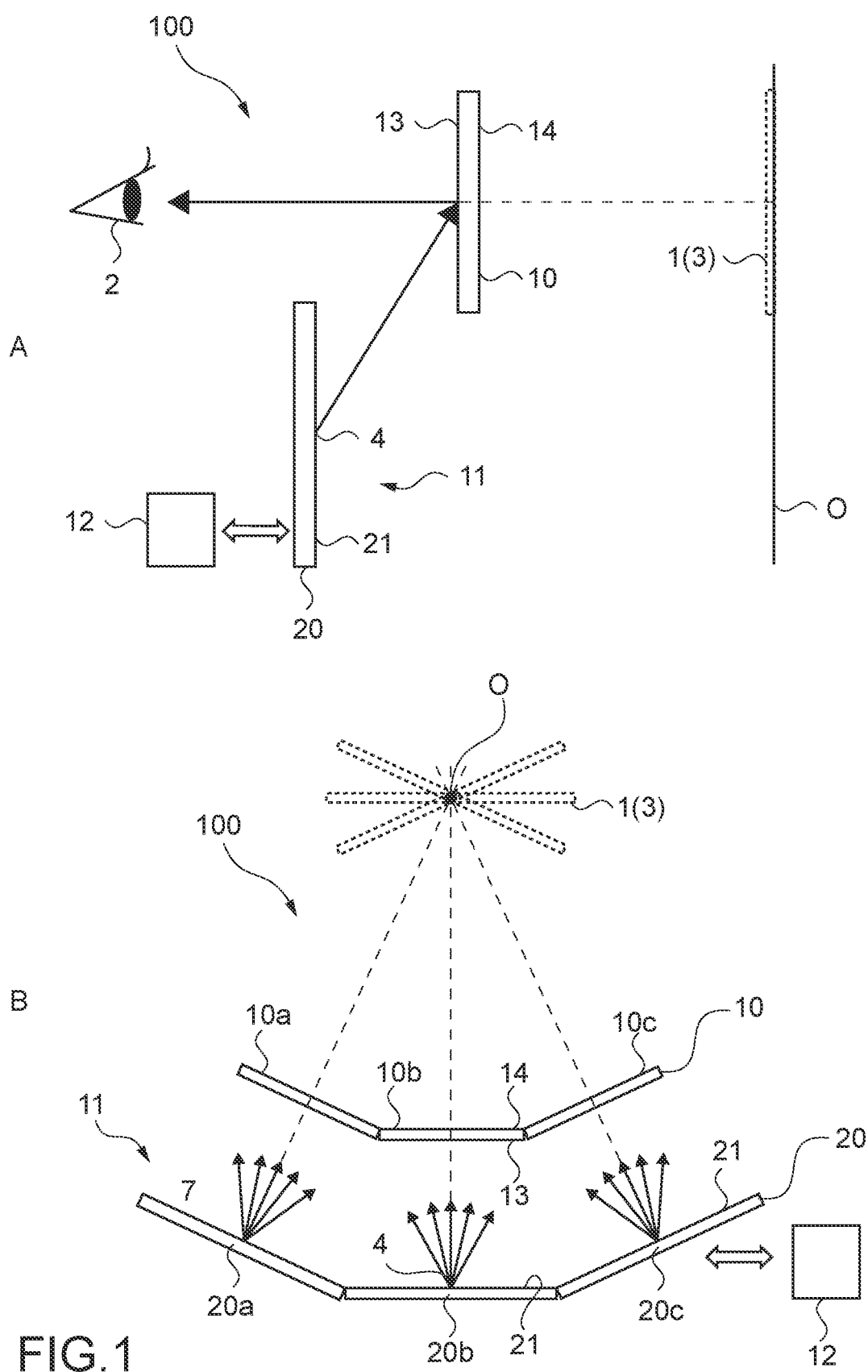
FIG. 1 A schematic diagram showing a basic configuration of an image display apparatus according to a first embodiment of the present technology.

FIG. 1 is a schematic diagram showing a basic configuration of an image display apparatus according to a first embodiment of the present technology. FIG. 1A and FIG. 1B are a side view and a top view of an image display apparatus 100. The image display apparatus 100 is an apparatus that stereoscopically displays a virtual image 1 of a display target toward a user located around the apparatus. For example, images (virtual images 1) of the display target as viewed from various viewpoints 2 are displayed on the image display apparatus 100 in accordance with the position of the viewpoint 2. Thus, when the user's viewpoint 2 is moved, the virtual image 1 representing the display target as viewed from the moved viewpoint 2 can be observed. Accordingly, stereoscopic display can be performed as if the display target exists in the actual space. In FIG. 1, virtual image planes 3 on which the virtual images 1 are formed are schematically shown as the dotted-line regions.

The image display apparatus 100 includes a plurality of virtual-image screens 10, a multi-viewpoint video source 11, and a video control unit 12. In the image display apparatus 100, an image of the display target displayed by the multi-viewpoint video source 11 is displayed as the virtual image 1 by the virtual-image screen 10. Moreover, the video control unit 12 controls the image displayed by the multi-viewpoint video source 11. In the present disclosure, the image includes a still image and a moving image (video). Hereinafter, the description will be given assuming that the direction of the surface on which the image display apparatus 100 is arranged is a horizontal direction and a direction perpendicular to it is a vertical direction.

The plurality of virtual-image screens 10 is arranged to cover at least a part of a periphery of a center axis O. Here, the center axis O is, for example, an axis that is a basis for displaying the virtual image 1. The center axis O is typically set to be parallel to the vertical direction. In this embodiment, the plurality of virtual-image screens 10 is arranged to partially surround the center axis O. It should be noted that the present technology can also be applied to a configuration (see FIG. 10, etc.) in which the plurality of virtual-image screens 10 is arranged to cover the entire periphery of the center axis O. In this embodiment, the center axis O corresponds to a predetermined axis.

The virtual-image screen 10 displays the virtual image 1 of the image projected onto each virtual-image screen 10 by using the center axis O as the basis. Moreover, the virtual-image screen 10 is transparent. As will be described later, a viewpoint image 4 that is a real image displayed by the multi-viewpoint video source 11 is projected onto each virtual-image screen 10. The virtual image 1 of this viewpoint image 4 is displayed by using the center axis O as the basis. Thus, the virtual-image screen 10 displays the virtual image 1 of the viewpoint image 4, which is displayed by the multi-viewpoint video source 11, on the background by using the center axis O as the basis.

In this embodiment, a holographic optical element (HOE) is used as the virtual-image screen 10. The HOE is an optical element using holography and diffracts light with interference fringes recorded in advance to thereby achieve light travelling direction control (optical path control). For example, an HOE configured to emit, at a predetermined angle of emission, light entering the HOE at a predetermined angle of incidence is used as the virtual-image screen 10. Accordingly, light entering the HOE (virtual-image screen 10) can be emitted in a desired direction. It should be noted that the HOE may have properties of a plane mirror/curved mirror for controlling the position of the virtual image 1.

Moreover, in this embodiment, a reflection-type holographic optical element (reflection-type HOE) is used as the virtual-image screen 10. The reflection-type HOE is configured to diffract and reflect light entering the reflection-type HOE within a specific angle range and transmit light entering the reflection-type HOE within the other angle range. For example, light entering the reflection-type HOE within the specific angle range is emitted from the surface, which the light has entered, at an angle of emission depending on the angle of incidence. Moreover, light entering the reflection-type HOE at an angle of incidence other than the specific angle range is less likely to be diffracted by the interference fringes and passes through the reflection-type HOE. Accordingly, the virtual-image screen 10 is configured to be transparent and the virtual image can be displayed on the background through the virtual-image screen 10. In this manner, the virtual-image screen 10 functions as a combiner that displays the virtual image 1 of the display target on the background.

The virtual-image screen 10 is, for example, configured by using a volume HOE having interference fringes recorded inside the element. Moreover, a relief (embossed) HOE or the like having interference fringes recorded as irregularities of the element surface or the like may be used as the virtual-image screen 10. Such an HOE is an example of a diffractive optical element (DOE). As such, the virtual-image screen 10 is configured by using the diffractive optical element. It should be noted that a diffraction optical element of a type that diffracts light by using diffraction grating of a predetermined pattern or the like may be used other than the HOE that diffracts light by recorded interference fringes.

The specific configuration of the virtual-image screen 10 is not limited. For example, a half mirror may be used as the virtual-image screen 10. Also in a case where the half mirror is used, it is possible to display the virtual image 1 of the viewpoint image 4 on the background. It should be noted that reflection with the half mirror is regular reflection. Therefore, in the configuration in which the half mirror (virtual-image screen 10) is vertically arranged as shown in FIG. 1, the viewing range of the virtual image 1 is a range to see the half mirror obliquely from above. In addition, an arbitrary optical element capable of displaying the virtual image may be used as the virtual-image screen 10.

As shown in FIG. 1A and FIG. 1B, the virtual-image screen 10 has a rectangular flat-plate shape in a planar view and has a surface 13 and a back surface 14 that are surfaces on opposite sides to each other. The respective virtual-image screens 10 are arranged adjacent to each other at a predetermined angle while the respective back surfaces 14 face the center axis O. Each virtual-image screen 10 displays the virtual image 1 on the side of the back surface 14 facing the center axis O. Moreover, each virtual-image screen 10 is arranged to be parallel to the center axis O (vertical direction). It should be noted that each virtual-image screen 10 may be arranged, inclined with respect to the center axis O. In FIG. 1B, three virtual-image screens 10a to 10c are arranged adjacent to each other in the stated order from the left side.

As described above, in the image display apparatus 100, the plurality of virtual-image screens 10 configures a multi-screen by using the center axis O as the basis. The virtual image 1 of the viewpoint image 4 is displayed inside this multi-screen (on the side of the center axis O). In this embodiment, the multi-screen is a screen having polygonal surfaces (e.g., polygonal surfaces that constitutes a regular prism) internally provided in a cylindrical surface having the center axis O as the center. By arranging the virtual-image screens 10 to surround the center axis O in this manner, it is possible to observe the virtual image 1 in each orientation by using the center axis O as the basis. The specific configuration of the virtual-image screen 10 will be described later in detail.

The multi-viewpoint video source 11 includes a plurality of multi-view displays 20. The multi-view display 20 has a rectangular flat-plate shape in a planar view and has a display surface 21 that displays the viewpoint image 4. In the multi-view display 20, the viewpoint image 4 to be displayed changes in a manner that depends on the direction to see the display surface 21. The respective multi-view displays 20 are arranged adjacent to each other at a predetermined angle while the respective display surfaces 21 face the surfaces 13 of the corresponding virtual-image screens 10. In this manner, in the image display apparatus 100, the plurality of multi-view displays 20 configures a multi-screen display by using the center axis O as the basis. In FIG. 1B, multi-view displays 20a to 20c are arranged to face the three virtual-image screens 10a to 10c, respectively.

Moreover, it can also be said that in the image display apparatus 100, a pair of the virtual-image screen 10 and the multi-view display 20 configures a display unit that displays the virtual image 1. FIG. 1A shows a side view as the display unit constituted by the virtual-image screen 10 and the multi-view display 20 is viewed from the side. The image display apparatus is configured by arranging a plurality of such display units rotationally moved around the center axis O.

As shown in FIG. 1A, the multi-view display 20 is arranged at a position shifted downward from the front of the virtual-image screen 10. That is, the display surfaces 21 (multi-view displays 20) are arranged not to block virtual images displayed by the plurality of virtual-image screens 10. Accordingly, for example, the display range of the virtual image 1 or the like can be expanded. Thus, the image display apparatus 100 has a configuration in which the multi-screen display constituted by the plurality of multi-view displays 20 is arranged avoiding the optical paths of the virtual images 1 outside the multi-screen constituted by the plurality of virtual-image screens 10. In this embodiment, the multi-viewpoint video source 11 corresponds to a display section.

The virtual image 1 displayed through the virtual-image screen 10 is configured by the image (viewpoint image 4) displayed on the display surface 21 of the corresponding multi-view display 20. That is, it can be said that the user observing the virtual image 1 is seeing the display surface 21 via the virtual-image screen 10. Hereinafter, the direction in which the user sees the multi-view display 20 via the virtual-image screen 10 will be referred to as a real-image observation direction. Moreover, the direction extending toward the center axis O from the user's viewpoint 2 will be referred to as a virtual-image observation direction. For example, at a viewpoint 2 directed in the virtual-image observation direction, a viewpoint image 4 displayed in the real-image observation direction corresponding to this viewpoint 2 is observed as the virtual image 1.

Figure 2:
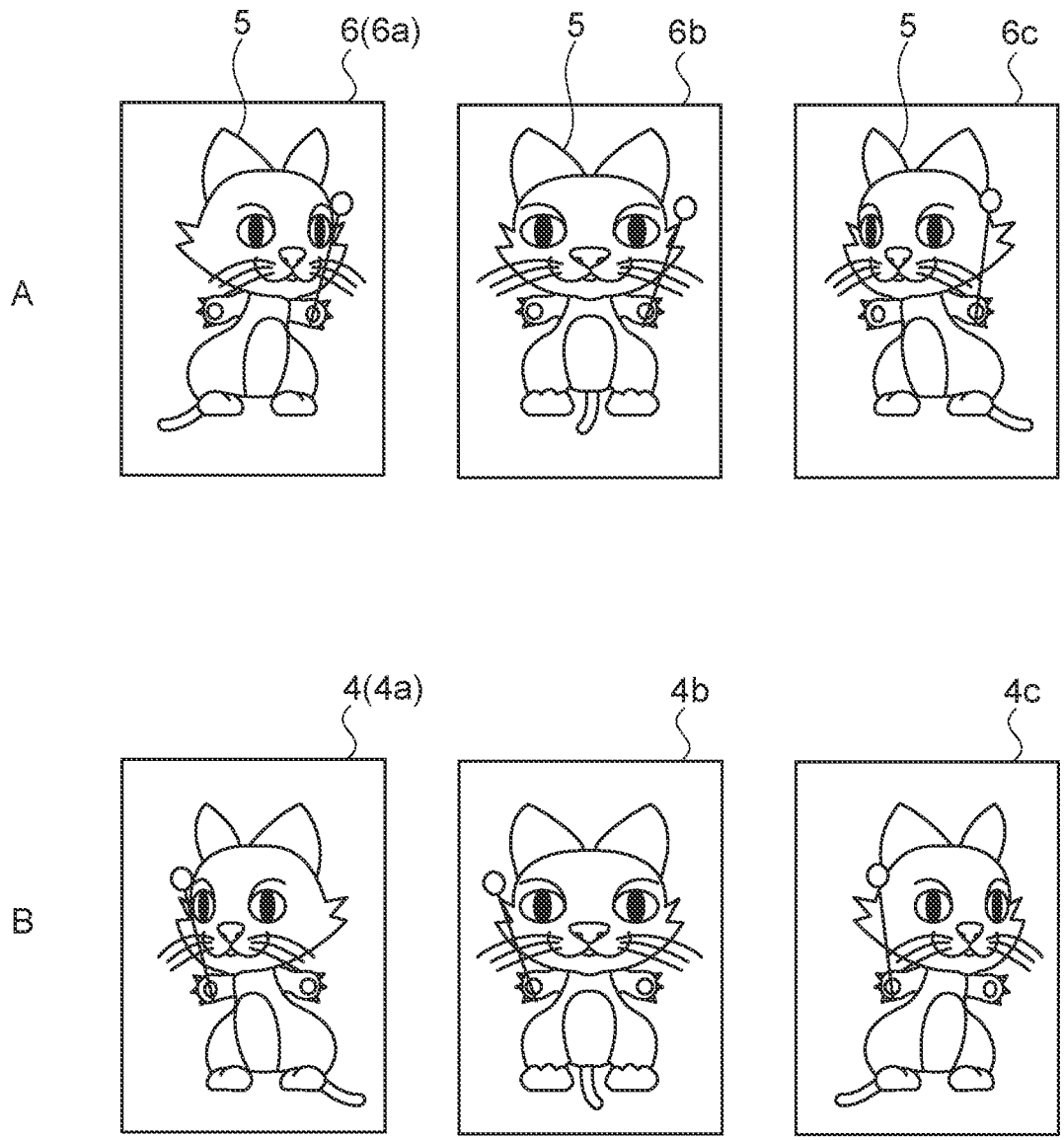
FIG. 2 A schematic diagram showing an example of a viewpoint image.

Here, the viewpoint image 4 displayed on the display surface 21 of the multi-view display 20 will be described. FIG. 2 is a schematic diagram showing an example of the viewpoint image 4. In the present disclosure, the viewpoint image 4 is an image that can be displayed as a virtual image in a state in which a display target 5 is viewed from mutually different directions. Thus, the viewpoint image 4 does not need to be an image showing the display target 5 just as it is viewed.

As described above, in this embodiment, the reflection-type virtual-image screen 10 is used. That is, the virtual-image screen 10 reflects the viewpoint image 4 projected from the display surface 21 and displays the virtual image 1 of the viewpoint image 4. Thus, the image displayed as the virtual image 1 is a horizontally-flipped image (mirror image) of the viewpoint image 4 displayed on the display surface 21. In this case, the video control unit 12 to be described later displays, in the virtual-image observation direction, the viewpoint image 4 obtained by flipping horizontally an image of the display target 5 as viewed from the real-image observation direction. Accordingly, the virtual image 1 of the display target 5 can be appropriately displayed without flipping horizontally the virtual image 1 of the display target 5.

FIG. 2A shows captured images 6a to 6c obtained by imaging a character (display target 5) holding a stick in its left hand from the left side, the front, and the right side. Moreover, FIG. 2B shows viewpoint images 4a to 4c displaying the captured images 6a to 6c of FIG. 2A. As shown in FIG. 2A, the captured images 6 are images obtained by imaging the character as it is. The viewpoint images 4 reflecting them and displayed as virtual images are horizontally-flipped images obtained by reversing the captured images 6 horizontally. Thus, the viewpoint images 4a to 4c are images in which the character that is the display target 5 holds the stick in its right hand.

The viewpoint images 4 are generated on the basis of, for example, images obtained by imaging the stationary display target 5 while changing the imaging direction (imaging orientation) without changing the imaging distance. At that time, an angular pitch for changing the imaging direction is typically set to be a constant angle. It should be noted that the display target 5 may be an object that exists in the real space or may be a 3D model or the like created by using computer graphics or the like. Moreover, images or the like, which are deformed for correcting distortion and the like when they are displayed as the virtual images 1, may be used as the viewpoint images 4. It should be noted that as will be described later, in a case where the transmission-type virtual-image screen is used, images showing the display target 5 just as it is viewed are used as the viewpoint images 4.

Referring back to FIG. 1, the plurality of viewpoint images 4 is switched in accordance with the viewing direction and displayed on the display surface 21 of the multi-view display 20. That is, the display surface 21 displays, in mutually different directions, the plurality of viewpoint images 4 that are images of the display target 5 as viewed from mutually different directions. In FIG. 1B, directions in which the respective viewpoint images 4 are displayed from the display surface 21 (hereinafter, referred to as display directions 7) are schematically shown as the black arrows. The display direction 7 is a direction in which light that displays the center of each viewpoint image 4 is emitted, for example. Thus, when directly looking at the display surface 21 from a point to which the display direction 7 is directed, an image configured by image light emitted in the display direction 7 is observed. The display surface 21 is configured to switch and display the viewpoint image 4 as shown in FIG. 2 for each of those display directions 7.

In the image display apparatus 100, the plurality of display surfaces 21 projects the plurality of viewpoint images 4 displayed on the respective display surfaces 21 onto the plurality of virtual-image screens 10, respectively. Specifically, the plurality of viewpoint images 4 is projected onto one virtual-image screen 10 from one display surface 21 paired therewith in the display unit. It should be noted that a case where the viewpoint image 4 is projected onto a single virtual-image screen 10 from a plurality of display surfaces 21 and a configuration in which the viewpoint image 4 is projected onto a plurality of virtual-image screens 10 from a single display surface 21 are conceivable.

As described above, the plurality of viewpoint images 4 is projected onto the virtual-image screen 10. As a result, the virtual images 1 of the plurality of viewpoint images 4 are displayed on the virtual-image screen 10 in a switching manner in accordance with the direction of viewing the virtual-image screen 10 (position of the viewpoint 2).

The video control unit 12 controls the display of the viewpoint image 4 to be displayed on each multi-view display 20 (display surface 21) of the multi-viewpoint video source 11. Specifically, image data (video data) of the viewpoint image 4 displayed in each display direction is generated and displayed on each display surface 21. The video control unit 12 is configured by using, for example, a computer such as a PC and a server apparatus. An operation of the video control unit 12 will be described later.

As shown in FIG. 1, in this embodiment, the virtual-image screens 10 and the multi-view displays 20 are configured such that the virtual image planes 3 on which the virtual images 1 of the respective viewpoint images 4 are formed overlap each other, having the center axis O as the center. Accordingly, the situation where the position of the virtual image 1 of the display target 5 is shifted depending on viewing directions can be avoided. It should be noted that the virtual images 1 do not necessarily need to overlap each other at the center. For example, when the multi-view displays 20 are positioned closer to the virtual-image screens 10, the virtual image planes 3 are also positioned closer to the virtual-image screens 10. In this case, the stereoscopic display using the viewpoint images 4 can be performed as long as the user can see the virtual images 1 as continuous images. Thus, the display size can be reduced by reducing the distance between the multi-view displays 20 and the virtual-image screens 10 to the extent that the virtual images 1 are continuous.

Figure 3:
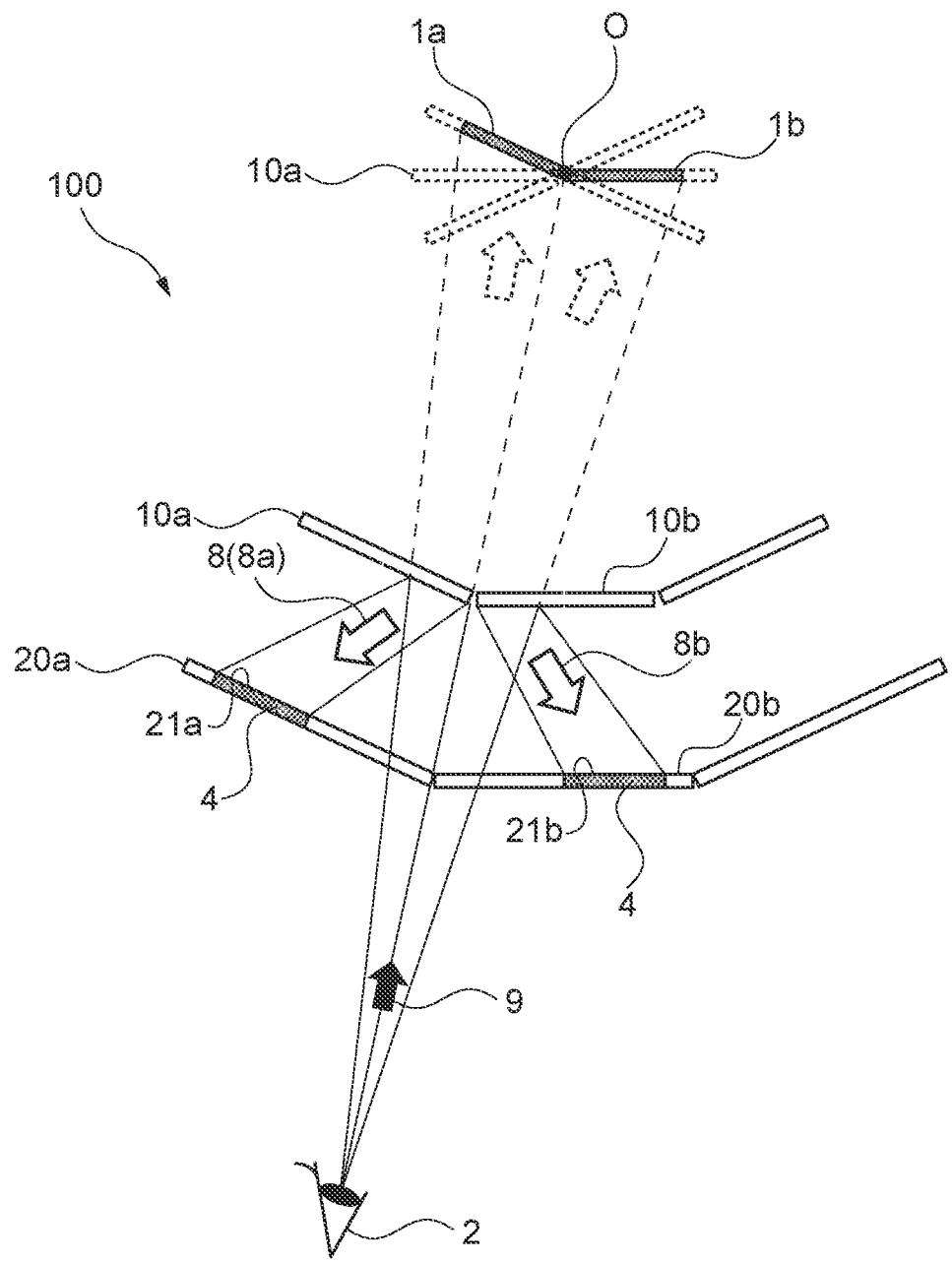
FIG. 3 A schematic diagram for describing stereoscopic display by the image display apparatus.

FIG. 3 is a schematic diagram for describing stereoscopic display by the image display apparatus 100. Hereinafter, a method of displaying the viewpoint images 4 for performing the stereoscopic display will be described with reference to FIG. 3. Here, it is assumed that the user directs the viewpoint 2 to the center axis O and observes the virtual image 1 via the two virtual-image screens 10a and 10b. For example, as shown in FIG. 3, the virtual image 1 that the user observes is an image in which the virtual images 1a and 1b of the viewpoint images 4 displayed on the multi-view displays 20a and 20b are combined.

When the user attempts to see a display object via the two virtual-image screens 10a and 10b adjacent to each other, the user sees the display surfaces 21 of the two multi-view displays 20a and 20b reflected on the respective virtual-image screens 10a and 10b, at different angles. That is, angles at which the user sees the respective display surfaces 21 via the virtual-image screens 10, i.e., directions in which the user sees the respective display surfaces 21 are different from each other.

In FIG. 3, real-image observation directions 8a and 8b directed to the multi-view displays 20a and 20b are schematically shown as the hollow arrows. Moreover, a virtual-image observation direction 9 directed to the center axis O from the user's viewpoint 2 is schematically shown as the solid arrow. In this embodiment, the real-image observation directions 8 correspond to a first direction and the virtual-image observation direction 9 corresponds to a second direction.

In the image display apparatus 100, the video control unit 12 displays, in the real-image observation directions 8 to see the display surfaces 21 from the user's viewpoint 2 around the virtual-image screens 10 via the virtual-image screens 10, the viewpoint images 4 that are virtual images of the display target 5 as viewed from the virtual-image observation direction 9 extending toward the center axis O from the user's viewpoint 2. That is, the viewpoint images 4 displayed in the real-image observation directions 8 to see the display surfaces 21 from the certain viewpoint 2 are images displaying the state of the display target 5 that should be observed from this viewpoint 2 as the virtual images 1.

For example, the video control unit 12 displays, in the real-image observation directions 8a and 8b in which the user sees the respective display surfaces 21a and 21b, the viewpoint images 4 displaying the display target 5 that is visible from the user's viewpoint 2 (in the virtual-image observation direction 9), on the respective display surfaces 21a and 21b. It should be noted that the viewpoint images 4 are respectively displayed on the respective display surfaces 21a and 21b such that the display target 5 displayed as the virtual images 1 has an identical center axis. Accordingly, also in a case of observing the virtual images 1 through the boundary between the virtual-image screens 10, the images of the display target 5 that is visible from the user's viewpoint 2 can be displayed as the virtual images as appropriate.

Moreover, also in a case where the virtual image 1 observed at the user's viewpoint 2 is displayed via a single virtual-image screen 10, the viewpoint image 4 that is the virtual image of the display target 5 that is visible from this viewpoint 2 (in the virtual-image observation direction 9) is displayed in the real-image observation direction 8 directed to the corresponding display surface 21. Accordingly, the display target 5 can be observed in multiple orientations for each virtual-image screen 10. As a result, the image display apparatus 100 can display, irrespective of the position of the user's viewpoint 2, each viewpoint video of the display target 5 at angle resolution depending on the angular pitch at which the multi-viewpoint video source 11 performs display.

In this embodiment, images of the display target 5 as viewed from directions shifted by a predetermined angular pitch are used as the plurality of viewpoint images 4. Moreover, the video control unit 12 displays the viewpoint image 4 in accordance with the movement of the user's viewpoint 2 such that the virtual image of the display target 5 is switched at the predetermined angular pitch as viewed from this viewpoint 2. Accordingly, it is possible to display the viewpoint image 4 that is switched at a constant angle when the user moves and to realize natural stereoscopic display.

The method of setting the predetermined angular pitch is not limited. For example, the angular pitch is set to be an angle obtained by dividing, by an integer, an angle (center angle of the polygonal surface) formed by straight lines horizontally connecting both ends of the virtual-image screen 10 (multi-view display 20) with the center axis O. Accordingly, the viewpoint image 4 can be smoothly switched also at the boundary between the adjacent virtual-image screens 10. Moreover, the angular pitch may be set in accordance with the number of viewpoint images 4 that can be displayed by the multi-view displays 20.

In this manner, in the image display apparatus 100, the plurality of viewpoint images 4 displayed on the display surfaces 21 of the multi-viewpoint video source 11 are projected onto the virtual-image screens 10. Accordingly, the virtual image of the viewpoint image 4 can be switched and displayed for each virtual-image screen 10. Moreover, the image display apparatus 100 is configured by arranging a plurality of display units including the virtual-image screens 10 and the multi-view displays 20 around the center axis O. By arranging them in this manner, when the virtual-image screens 10 are viewed from multiple orientations, the virtual image planes 3 on which the virtual images 1 are formed can be limited within a certain constant range and the virtual images 1 can be observed without interruption. Accordingly, the motion parallax recognized in the user's movement can be greatly improved.

Moreover, by using the virtual-image screens 10 (combiners) that are the HOEs, for example, it is possible to sufficiently enhance the transparency and the luminance as compared to virtual-image display of a Pepper's ghost method using a half mirror or the like. Moreover, the virtual-image screens 10 can be arranged erected vertically. Therefore, it is possible to keep the horizontal width of the screen constant and it is possible to display the virtual image 1 in a wider display range. Accordingly, a big and bright virtual image 1 can be displayed on the background through the highly-transparent screen. Accordingly, stereoscopic display with an enhanced sense of reality can be realized.

Figure 4:
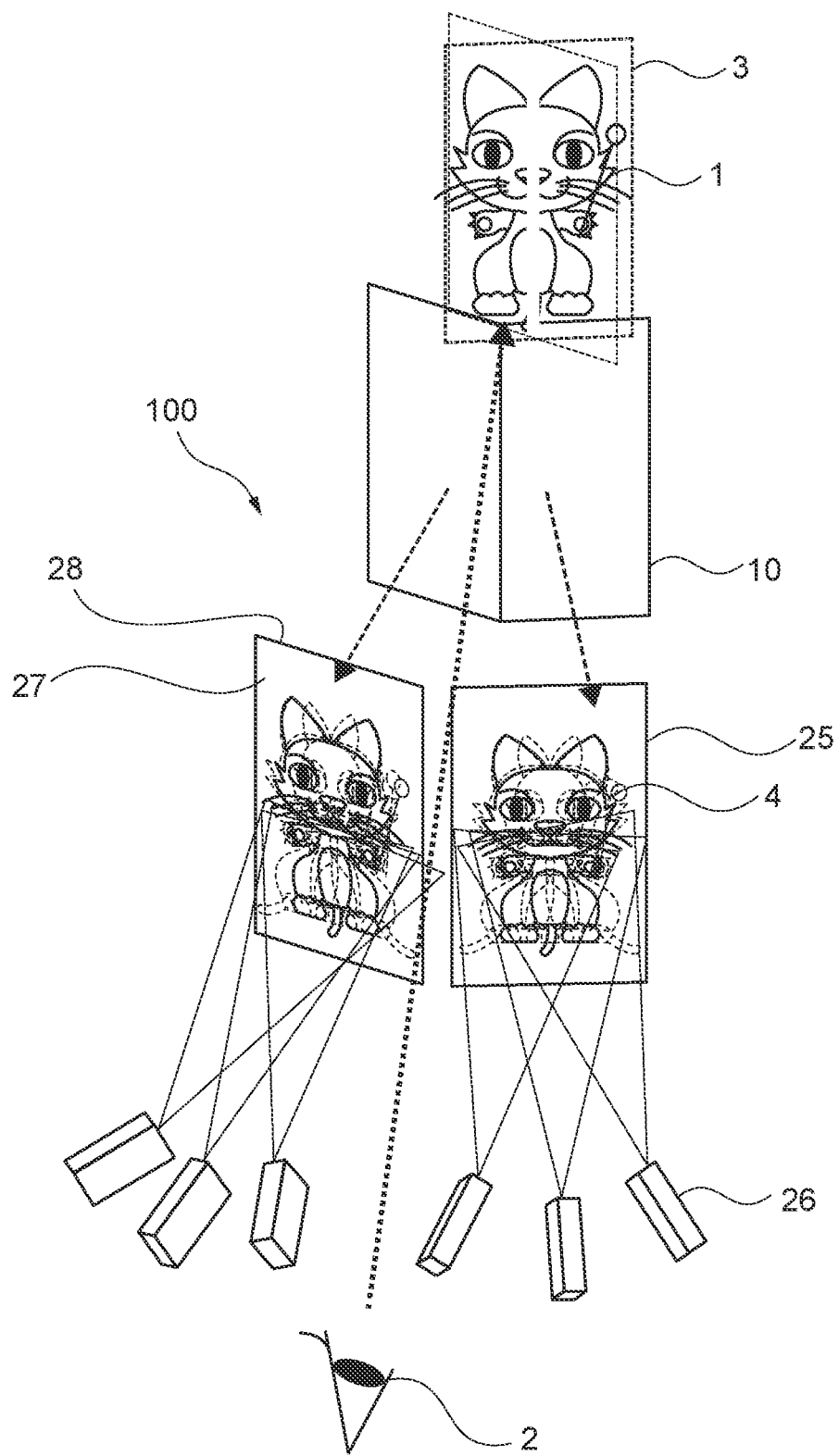
FIG. 4 A schematic diagram showing a specific configuration example of the image display apparatus.
Figure 5:
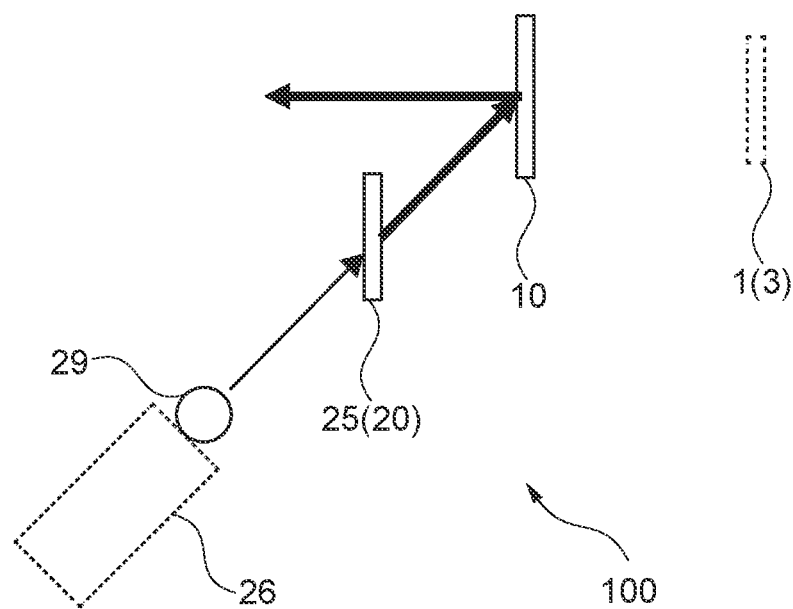
FIG. 5 A side view of the image display apparatus shown in FIG. 4.
Figure 6:
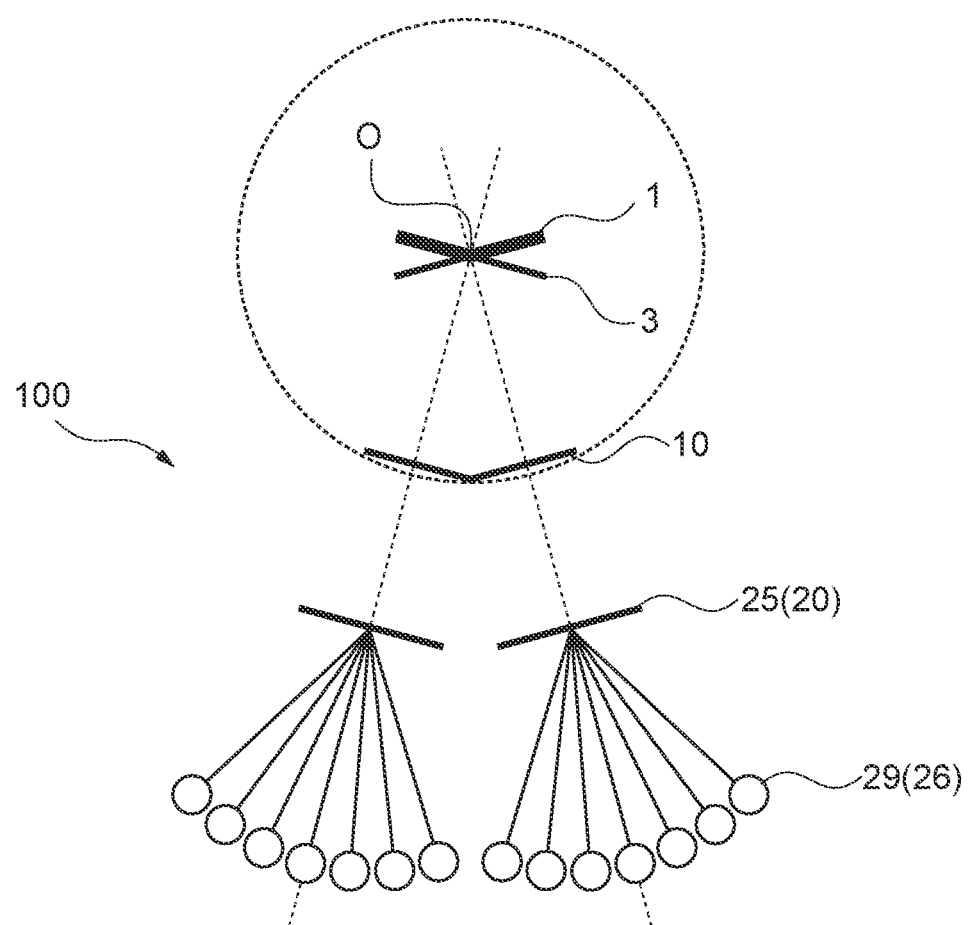
FIG. 6 A top view of the image display apparatus shown in FIG. 4.

FIG. 4 is a schematic diagram showing a specific configuration example of the image display apparatus 100. FIGS. 5 and 6 are a side view and a top view of the image display apparatus 100 shown in FIG. 4. In this embodiment, multi-projector displays are used as the multi-view displays 20 of the multi-viewpoint video source 11. The multi-viewpoint video source 11 includes a plurality of real-image screens 25 and pluralities of projectors 26. In the example shown in FIG. 4, each plurality of projectors 26 is provided and a projector array is configured for each real-image screen 25. The real-image screens 25 and the projector array function as the above-mentioned multi-view display 20.

The real-image screen 25 is a transmission-type anisotropic diffusion screen and includes a projection surface 27 on which images are projected from the respective projectors 26 and an image display surface 28 on a side opposite to the projection surface. This image display surface 28 is the above-mentioned display surface 21. The plurality of real-image screens 25 is arranged with the image display surfaces 28 (display surfaces 21) facing the corresponding virtual-image screens 10. Moreover, the real-image screen 25 has anisotropic diffusion properties different in diffusivity between the horizontal direction and the vertical direction. For example, the real-image screen 25 is set such that the horizontal diffusivity is smaller than the vertical diffusivity and configured to have diffusion properties narrower in the horizontal direction. Accordingly, it is possible to narrow the angle range of light diffused in the horizontal direction and it is possible to emit the plurality of viewpoint images 4 in desired orientations. Moreover, it is possible to widen the angle range of light diffused in the vertical direction. Accordingly, the viewpoint image 4 can be projected without increasing, in the vertical direction, the angle of incidence with respect to the virtual-image screen 10. It should be noted that the projectors 26 may be arranged inside the apparatus by employing reflection-type real-image screens 25 (see FIG. 10 and the like).

The real-image screens 25 are, for example, constituted by lens diffusion plates or the like with the horizontal and vertical diffusivity deviated by a micro-lens array or the like. Alternatively, transmission-type HOEs recording anisotropic diffusion properties may be used as the real-image screens 25. In a case where the HOEs are used, the relationship between the incident and reflection angles can be controlled. Therefore, the angle of projection of the projector 26 with respect to the real-image screen 25 can be reduced with the incident angle with respect to the virtual-image screen 10 kept. Accordingly, the size of the entire multi-viewpoint video source 11 can be reduced. Moreover, the HOE easily controls the diffusion properties, and therefore the viewpoint image 4 with higher quality can be displayed.

The plurality of projectors 26 projects images that configure the viewpoint images 4 on the projection surface 27 of the real-image screen 25. Specifically, as shown in FIG. 6, the plurality of projectors 26 projects images on the real-image screen 25 in mutually different directions. For example, the respective projectors are arranged such that light-emitting points 29 of the projectors 26 are arranged on the circumference of a circle with respect to the center of the real-image screen 25. Or, a projector module integrated such that the plurality of light-emitting points 29 are arranged on the circumference may be used. It should be noted that as shown in FIG. 5, each projector 26 projects an image obliquely from below the real-image screen 25. This projection angle is set in accordance with the projection angle of the display surface 21 with respect to the virtual-image screen 10, for example. Those projectors 26 project images on the projection surface 27 of the real-image screen 25, and the viewpoint images 4 are displayed on the display surface 21.

For example, pixel light that configures each pixel of an image displayed on the real-image screen 25 (display surface 21) is emitted in accordance with a direction of incidence upon the projection surface 27. By combining parts of images (typically, strip-shaped images) that the plurality of projectors 26 projects, respectively, utilizing this characteristic, the plurality of viewpoint images 4 can be displayed in each display direction. FIG. 4 schematically shows the plurality of viewpoint images 4 viewed from the side of the projection surface 27.

In the multi-projector system, the angular pitch at which the plurality of projectors 26 projects images onto the real-image screens 25 is an angular pitch (viewpoint pitch) of the viewpoint image 4 that can be displayed by the multi-viewpoint video source 11. By reducing the parallax angle of the both eyes than this angular pitch, it is possible to display different viewpoint images 4 to the both eyes of the user, respectively to provide a binocular parallax, and it is possible to reproduce a stereoscopic vision of the display target. It should be noted that even in a case where the angular pitch is large, a motion parallax can be added to the display target 5 such that it can be stereoscopically viewed by switching and displaying the viewpoint image 4 in accordance with the movement of the user's viewpoint position. Moreover, it is desirable that the horizontal diffusion angle of the real-image screen 25 be equal to the angular pitch of the projectors 26. Accordingly, it is possible to avoid the crosstalk or the like where the viewpoint images 4 that should be displayed in different directions are observed at the same time.

Moreover, the range of the entire projection angle in which the plurality of projectors 26 projects images onto the real-image screens 25 is a vision region (view-enabled angle) of the viewpoint images that can be displayed by the real-image screens 25. Therefore, for example, for displaying the display target 5 entirely, it is desirable to project the image at an angle as large as possible. For example, the entire projection angle can be increased by increasing the angle of view of projection of each projector 26.

It is desirable to use a laser light source as a light source for the projector 26. Accordingly, it is possible to display the viewpoint image 4 by using color light having a narrow wavelength width, and it is possible to increase the display luminance because the diffraction efficiency of the HOE (virtual-image screen 10 or real-image screen 25) is improved. Moreover, it is possible to avoid image blurring, color deviation, and the like due to color dispersion in the HOE. Moreover, for example, an LED light source may be used as the light source of the projector 26. In this case, by limiting the wavelength width of the color light through a wavelength filter or the like, image display having less color irregularity can be realized at low costs. In addition, the specific configuration of the projector 26 is not limited.

Figure 7:
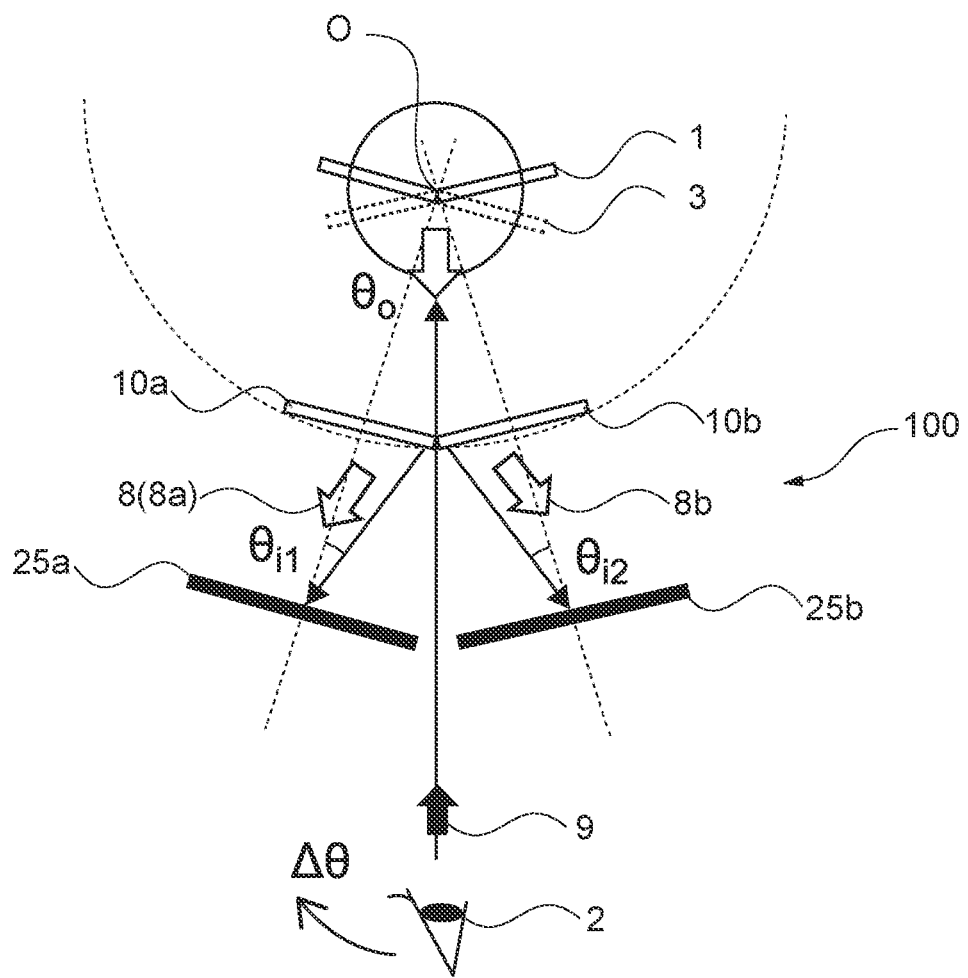
FIG. 7 A schematic diagram for describing a method of displaying viewpoint images projected onto reflection-type virtual-image screens.

FIG. 7 is a schematic diagram for describing a method of displaying the viewpoint images projected onto the reflection-type virtual-image screens 10. In FIG. 7, it is assumed that the user observes a virtual image in the virtual-image observation direction 9 passing through the boundary between the virtual-image screens 10a and 10b adjacent to each other. Moreover, a direction (direction opposite to the virtual-image observation direction 9 in FIG. 7) extending toward the boundary from the center axis O is set as a starting-point direction that is a starting point when displaying the display target 5. The starting-point direction is, for example, a direction in which the front of the display target 5 is directed. In FIG. 7, a direction of rotating in the counter-clockwise direction by using the center axis O as the basis as viewed from a top surface of the image display apparatus 100 is defined as a positive direction of the azimuthal angle.

The starting-point direction of the display target 5 (e.g., direction to observe the front of the display target 5 (virtual image)) is represented by the azimuthal angle using the center axis O as the basis. Here, it is assumed that the azimuthal angle in the starting-point direction is $\theta_0$ degrees. Thus, in FIG. 7, the virtual image 1 is observed from the viewpoint 2 at which the virtual-image observation direction 9 is the azimuthal angle of $\theta_0$. At this time, it is assumed that the angle to see the center of the real-image screen 25a on the left side as viewed from the user's viewpoint 2 is $\theta_{i1}$. Moreover, it is assumed that the angle to see the center of the real-image screen 25b on the right side as viewed from the user's viewpoint 2 is $\theta_{i2}$.

Here, the description will be given assuming that $\theta_{i1}$ and $\theta_{i2}$ are angles on the horizontal plane for the sake of description. For example, $\theta_{i1}$ ($\theta_{i2}$) is an angle formed by a straight line, which is obtained by projecting onto the horizontal plane the optical path extending toward the center of the real-image screen 25a (real-image screen 25b) via the virtual-image screen 10a (virtual-image screen 10b), and the normal line of the real-image screen 25a (real-image screen 25b). It can be said that these angles are angles representing the directions (real-image observation directions 8a and 8b) to see the respective real-image screens 25a and 25b.

For example, it is assumed that the user's viewpoint 2 is moved by $\Delta\theta$ and the azimuthal angle in the virtual-image observation direction 9 is $(\theta_0+\Delta\theta)$. That is, it is assumed that the viewpoint 2 is rotated in the counter-clockwise direction by AB, using the center axis O as the basis. In this case, the angle $\theta_{i1}$ to see the real-image screen 25a is $(\theta_{i1}-\alpha(\theta)\times\Delta\theta)$. Here, $\alpha(\theta)$ is a positive coefficient. In this case, $\theta_{i1}$ decreases due to the movement of the viewpoint 2 by $\Delta\theta$. It means that the direction to see the real-image screen 25a as viewed from the top surface is rotated in the clockwise direction. Moreover, the angle $\theta_{i2}$ to see the real-image screen 25b is $(\theta_{i2}+\beta(\theta)\times\Delta\theta)$. Here, $\beta(\theta)$ is a positive coefficient. In this case, $\theta_{i1}$ increases due to the movement of the viewpoint 2 by $\Delta\theta$. It means that the direction to see the real-image screen 25b as viewed from the top surface is rotated in the clockwise direction.

By displaying the viewpoint images 4 of the display target 5 at $\theta_0+\Delta\Delta$ degrees on the respective display surfaces 21 when seeing the display surfaces 21 of the real-image screens 25 at the angle changed by $\Delta\theta$ in this manner, it is possible to cause the user to see the virtual images of the display target 5 as viewed therefrom.

It should be noted that $\alpha(\theta)$ denotes a coefficient associated with the amount of change of the angle $\theta_{i1}$ to see the real-image screen 25a on the left side viewed from the viewpoint 2 and $\beta(\theta)$ denotes a coefficient associated with the amount of change of the angle $\theta_{i2}$ to see the real-image screen 25b on the right side viewed from the viewpoint 2. These coefficients are parameters for correcting the influence (angle deviation or the like) of projection angle transformation, lens effects, HOE diffraction aberrations, and the like and are represented as a function of the azimuthal angle $\theta$ of the viewpoint 2 using the azimuthal angle of $\theta_0$ as the basis. The virtual images 1 of the display target 5 can be correctly displayed by correcting the amount of change by using such a coefficient.

Figure 8:
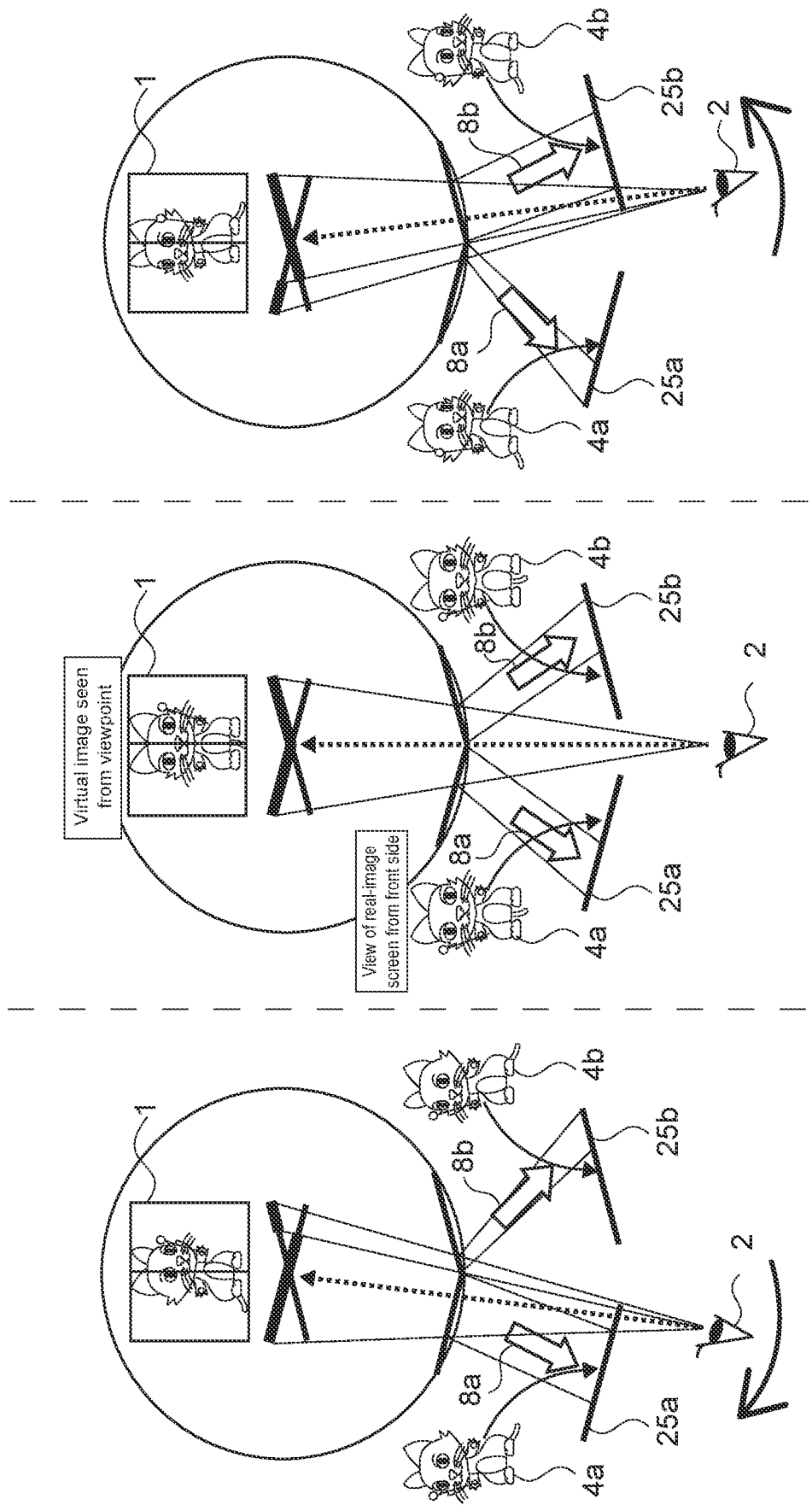
FIG. 8 A schematic diagram showing examples of viewpoint images displayed in accordance with an observation direction.
Figure 9:
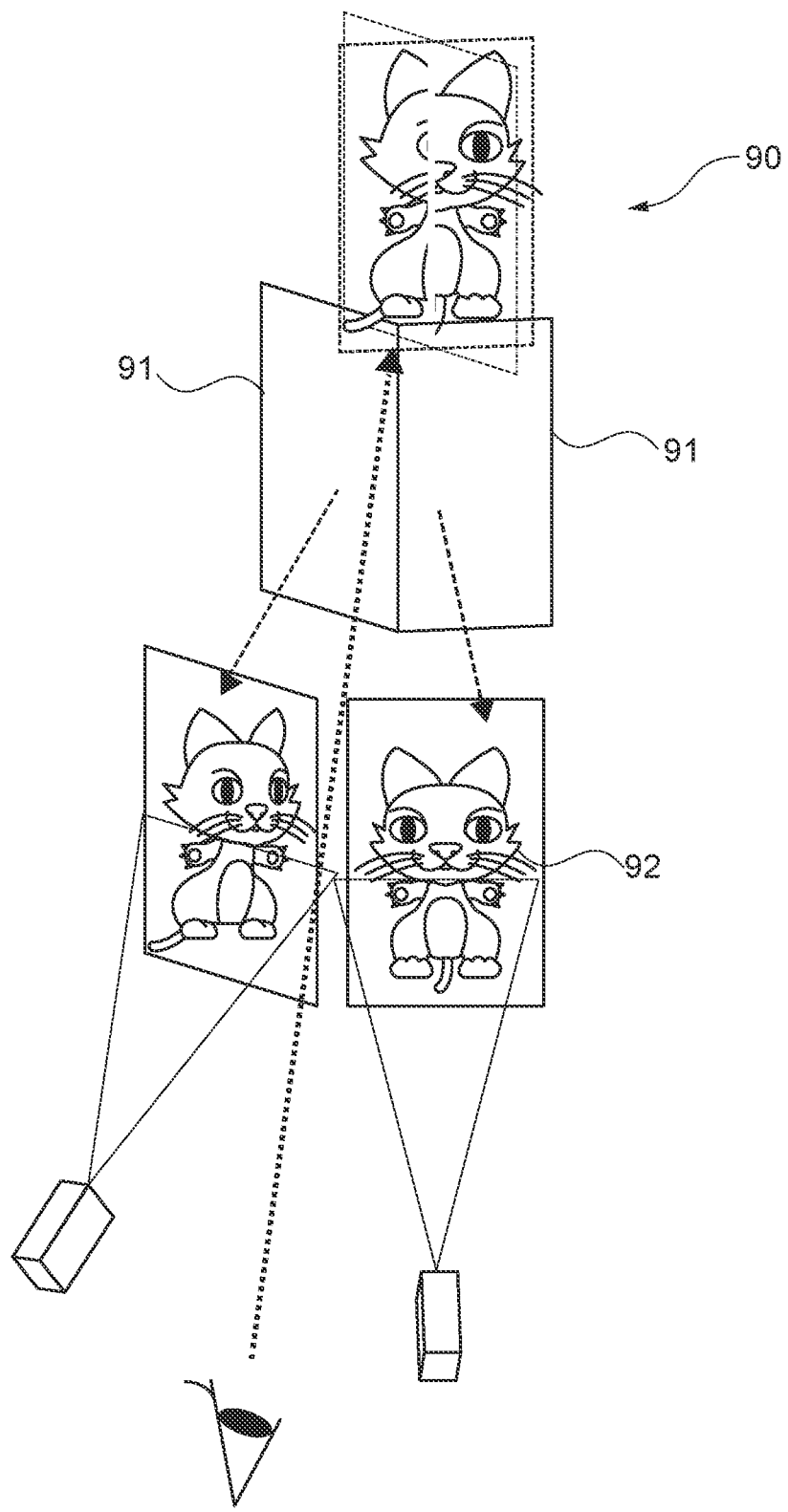
FIG. 9 A schematic diagram of a virtual-image display apparatus shown as a comparative example.

FIG. 9 is a schematic diagram showing examples of viewpoint images displayed in accordance with the observation direction. As shown in the illustration in the middle of FIG. 8, an image of the character (display target 5) holding the stick in its left hand as viewed from the front is displayed at the viewpoint 2 that observes the virtual images 1 in the starting-point direction. At that time, in each of the real-image screens 25a and 25b, the character holding the stick in its right hand is displayed in the real-image observation directions 8a and 8b as the viewpoint images 4a and 4b. It should be noted that in FIG. 8, the viewpoint images 4a and 4b observed as the real-image screens 25a and 25b are seen in the real-image observation directions 8a and 8b respectively from the front side are shown.

For example, when the user moves in the counter-clockwise direction from the state shown in the illustrated in the middle of FIG. 8 and observes the virtual images 1 of the character from the right side, the viewpoint images 4a and 4b showing the character rotated in the clockwise direction are displayed on the real-image screens 25a and 25b, respectively. Similarly, when the user moves in the clockwise direction and observes the virtual images 1 of the character from the left side, the viewpoint images 4a and 4b showing the character rotated in the counter-clockwise direction are displayed on the real-image screens 25a and 25b, respectively.

As described above, when the user moves by using the center axis O as the basis and observes the virtual images of the display target 5, the display target 5 rotated in a direction opposite to that of the user's movement is displayed on the display surfaces 21 of the real-image screens 25. Accordingly, the display target 5 can be appropriately displayed in accordance with the user's movement.

As described above, in the image display apparatus 100 according to this embodiment, the plurality of transparent virtual-image screens 10 is arranged to cover at least a part of the periphery of the center axis O. Moreover, the plurality of display surfaces 21 that displays the plurality of viewpoint images 4 of the display target 5 in different directions are provided. The plurality of viewpoint images 4 is projected onto the respective virtual-image screens 10. At that time, in the direction (real-image observation direction 8) to see the display surfaces 21 from the certain viewpoint 2 via the virtual-image screens 10, the viewpoint images 4 that are the virtual images 1 of the display target 5 visible when seeing the center axis O from this viewpoint 2 is displayed. Accordingly, stereoscopic display with an enhanced sense of reality can be realized.

A method of tilting a half mirror with respect to the horizontal direction and displaying a virtual image of an object, which is called Pepper's ghost, is known as a method of displaying an object by utilizing a virtual image. For example, in a case of displaying a virtual image as if an object exists on the deep side of the screen via a single half mirror, it is difficult to express a viewpoint video in which the orientation in which the object is visible changes in accordance with the user's movement or the like, and the sense of reality of the object may be impaired. Moreover, a method of using a half mirror with multiple surfaces for stereoscopically displaying an object is conceivable. In this case, there is a fear that switching between videos may be quick when crossing adjacent surfaces and the sense of reality may be impaired. Moreover, with the method using the half mirror, increasing the number of surfaces may reduce the size of the reflective surface, and it may reduce the video size.

FIG. 9 is a schematic diagram of a virtual-image display apparatus 90 shown as a comparative example. FIG. 9 schematically shows the virtual-image display apparatus 90 that displays the virtual image 1 by using HOEs 91. This virtual-image display apparatus 90 projects images of a target 92 as viewed from one direction with respect to the HOEs 91 arranged in a columnar form. Therefore, when the user's gaze crosses the boundary between the HOEs 91, the images of the target 92 quickly change, and therefore the sense of reality of the stereoscopic display may be impaired.

In this embodiment, the viewpoint images of the display target 5 is projected onto each of the plurality of virtual-image screens 10. Accordingly, the viewpoint images of the display target 5 as viewed from multiple directions are displayed for each virtual-image screen 10. Moreover, the plurality of virtual-image screens 10 is arranged to surround the center axis.

Accordingly, it is possible to display the viewpoint images 4 of the display target 5 by virtual-image display at fine intervals (angular pitches). As a result, unnatural display in which the orientation of the display target 5 is suddenly changed is suppressed, and stereoscopic display with an enhanced sense of reality can be performed.

Moreover, the viewpoint image 4 is displayed in the direction (virtual-image observation direction 9) in which the user's viewpoint 2 sees the display surface 21 via the virtual-image screen 10 such that the display target visible from this viewpoint 2 is displayed. That is, in accordance with a difference between the observation directions of the respective virtual image planes 3 as viewed from the user, the display of the display surfaces 21 is controlled to form viewpoint images 4 of the display target as viewed from that direction. Accordingly, irrespective of the position of the viewpoint 2, it is possible to appropriately display the virtual images 1 of the display target 5 that should be observed at this viewpoint.

Moreover, in this embodiment, the HOEs are used as the virtual-image screens 10. Accordingly, the virtual-image screens 10 can be arranged erected vertically. As a result, it is possible to improve the reproducibility of the viewpoint images 4 of the display target 5 also including a case of crossing the boundary between the virtual-image screens 10 without reducing the video size, and stereoscopic display that provides a sense of reality can be realized.

Second Embodiment

An image display apparatus according to a second embodiment of the present technology will be described. Hereinafter, descriptions of portions similar to the configurations and actions in the image display apparatus 100 described in the above embodiment will be omitted or simplified.

Figure 10:
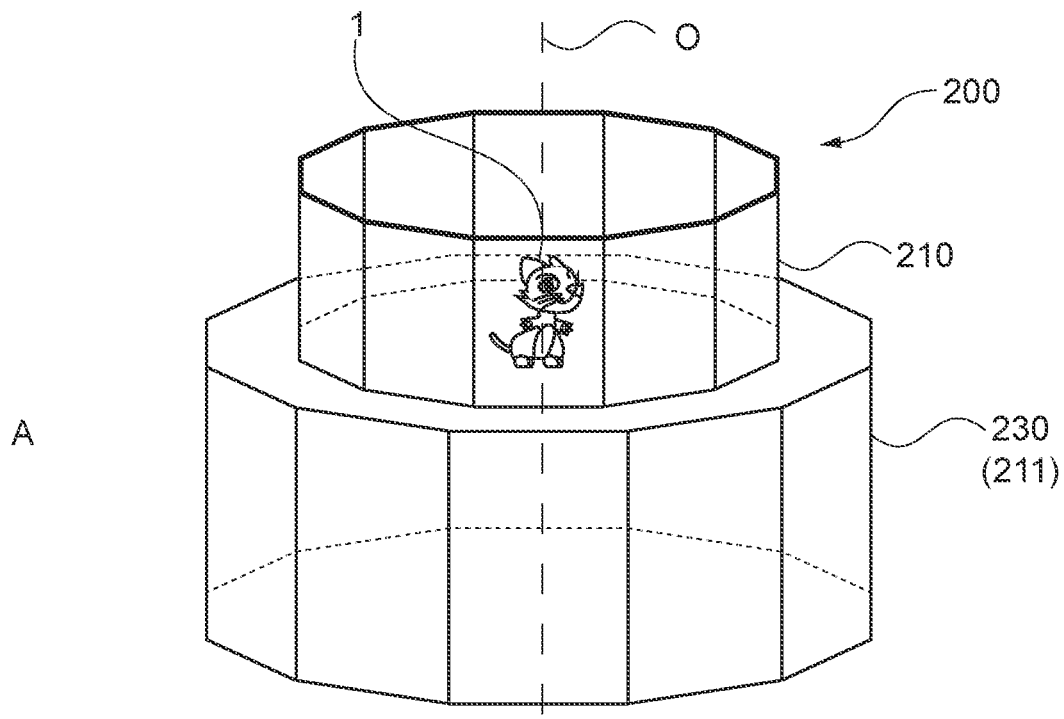
FIG. 10 A schematic diagram showing a configuration example of an image display apparatus according to a second embodiment.
Figure 10:
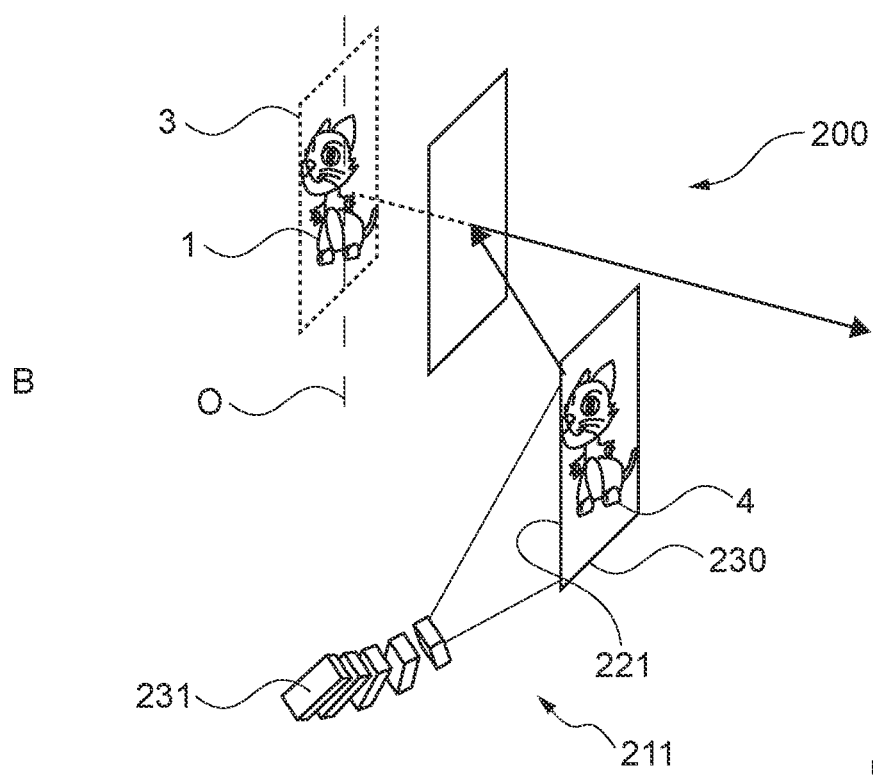
Figure 11:
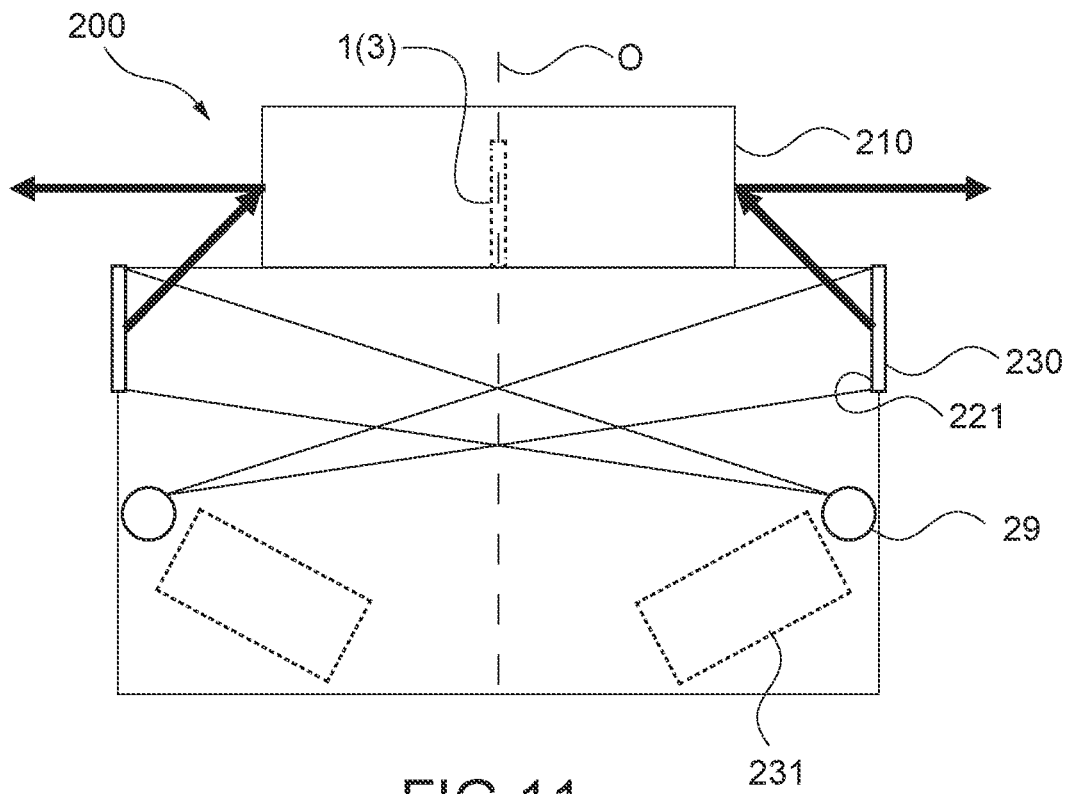
FIG. 11 A cross-sectional view of the image display apparatus shown in FIG. 10.
Figure 12:
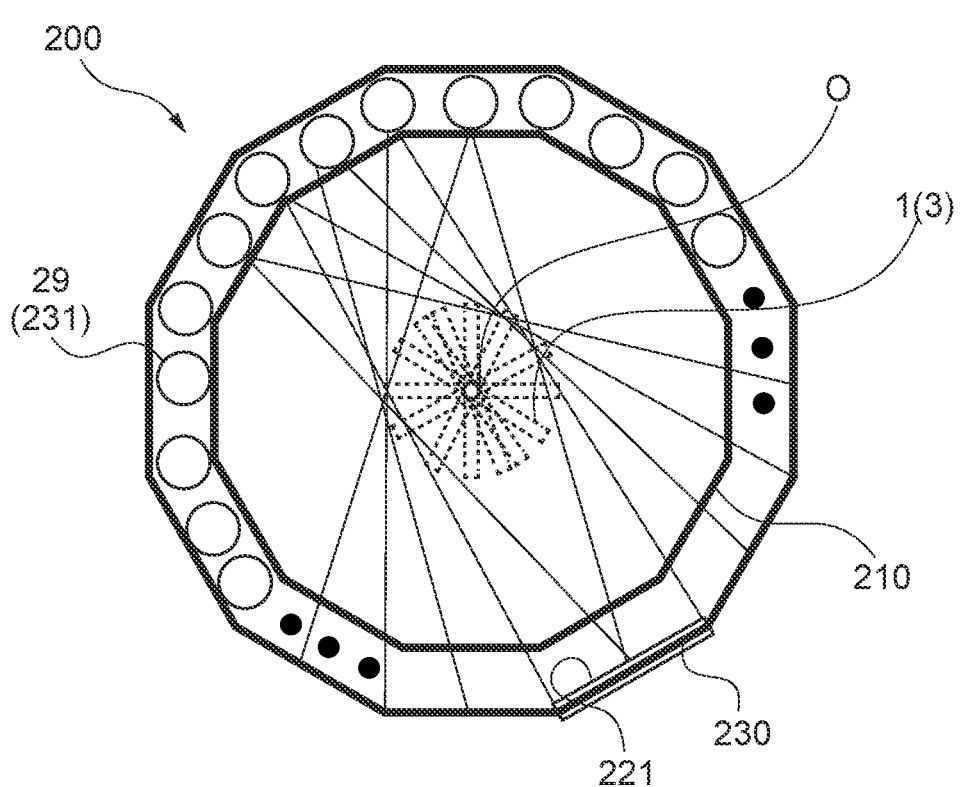
FIG. 12 A top view of the image display apparatus shown in FIG. 10.

FIG. 10 is a schematic diagram showing a configuration example of an image display apparatus according to the second embodiment. FIG. 10A is a perspective view of an image display apparatus 200 and FIG. 10B is a schematic diagram showing an internal configuration example of the image display apparatus 200. FIGS. 11 and 12 are a cross-sectional view and a top view of the image display apparatus 200 shown in FIG. 10. The image display apparatus 200 includes a plurality of virtual-image screens 210 and a multi-viewpoint video source 211 and functions as an all-around display capable of displaying virtual images 1 of a display target 5 as viewed from all orientations.

As shown in FIG. 10A, the plurality of virtual-image screens 210 is arranged to cover the entire periphery of the center axis O. These virtual-image screens 210 configure a columnar multi-screen by using the center axis O as the basis. Moreover, the virtual-image screens 210 are reflection-type holographic optical elements (HOEs). Thus, the image display apparatus 200 displays, inside the multi-screen, the virtual images 1 of the display target 5 of viewpoint images 4 projected from the outside of the multi-screen. It should be noted that the HOE may have properties of a plane mirror/curved mirror for controlling the position of the virtual image 1.

The multi-viewpoint video source 211 includes a plurality of real-image screens 230 and a plurality of projectors 231 that projects images onto the respective real-image screens 230 from the mutually different directions. In this embodiment, the real-image screens 230 and the plurality of projectors 231 configure multi-view display.

In this embodiment, the real-image screens 230 are reflection-type anisotropic diffusion screens. Thus, in the real-image screen 230, a surface onto which an image is projected from each projector 231 is a display surface 221 (image display surface) on which the viewpoint image 4 is displayed. The plurality of real-image screens 230 is arranged with the display surfaces 221 facing the corresponding virtual-image screens 210. These real-image screens 230 configure a configure multi-screen display by using the center axis O as the basis.

The real-image screen 230 has anisotropic diffusion properties different in diffusivity between the horizontal direction and the vertical direction and is configured by attaching a reflection plate to a transmission-type lens diffusion plate, for example. Moreover, the reflection-type HOE that has recorded anisotropic diffusion properties may be used as the real-image screen 230. The use of the HOEs can reduce the size of the entire multi-viewpoint video source 211 and can display the viewpoint images 4 at high quality.

The plurality of projectors 231 projects images toward the respective display surfaces 221 from the inside of the plurality of real-image screens 230 (multi-screen display) arranged around the center axis O. A laser light source or an LED light source is used as a light source of the projector 231. In a case where the LED light source is used, the wavelength width of the color light may be limited by using a wavelength filter or the like.

Hereinafter, a configuration for projecting an image onto the real-image screen 230 from the projector 231 will be described. FIG. 10B schematically shows a display unit including the reflection-type virtual-image screen 210 and the reflection-type real-image screen 230 as an internal configuration example of the image display apparatus 200. In this display unit, a projector array constituted by the plurality of projectors 231 is provided inside the real-image screen 230. For example, in a case where the size of the projector 231 is sufficiently small, a case where the apparatus size is large, or the like, a configuration to directly project an image onto the real-image screen 230 from each projector 231 can be used as shown in FIG. 10B.

FIG. 11 schematically shows a cross-sectional view of the image display apparatus 200 taken along the cross-section including the center axis O. FIG. 12 schematically shows a top view corresponding to the configuration shown in FIG. 11. In FIGS. 11 and 12, images are projected onto the real-image screens 230 by a method different from FIG. 10B. Here, the projectors 231 are arranged along the outer periphery of the apparatus, directed to upward and outward. Light of an image projected from the projector 231 is reflected via a mirror (not shown) and enters the real-image screen 230 arranged on a side opposite to the side on which the projector 231 is arranged. That is, an image is projected onto the respective real-image screens 230 from the light-emitting point 29 (mirror) on an opposite side across the center axis O. Accordingly, increasing the projection distance can increase the size of an image to be projected.

Moreover, by increasing the size of an image to be projected, the image can be projected onto a plurality of real-image screens 230 from a single projector 231, for example. In the example shown in FIG. 12, the single projector 231 projects an image onto two or three real-image screens 230. Accordingly, the number of projectors 231 can be reduced, which can reduce the apparatus cost.

In FIG. 12, the respective projectors 231 are arranged such that the respective light-emitting points 29 are arranged along the circumference that is the outer periphery of the apparatus. Alternatively, an integral-type projector module may be configured such that the plurality of light-emitting points is arranged along the outer periphery. By arranging the projectors 231 in this manner, the symmetry of light beam angles of the projectors 231 that enter the respective real-image screens 230 can be maintained. Accordingly, since images are projected onto the respective real-image screens 230 from the respective projectors 231 in a symmetrical manner, the plurality of viewpoint images 4 can be displayed as appropriate in different display directions.

The angular pitches at which the plurality of projectors 231 projects images onto the real-image screens 230 are the angular pitches (viewpoint pitches) of the viewpoint images 4 that can be displayed by the multi-viewpoint video source 211. For example, by making the angular pitches sufficiently small, stereoscopic display or the like that provides a binocular parallax can be performed. Moreover, the range of the entire projection angle in which the plurality of projectors 231 projects images onto the real-image screens 230 is a vision region (view-enabled angle) of the viewpoint images that can be displayed on the real-image screens 230. Therefore, increasing the angle of view of projection of each projector 231 can display the display target 5 without making it partially invisible.

Alternatively, a configuration to perform division and projection that divides and projects light emitted from the single projector 231 may be used. The division and projection can create the plurality of light-emitting points 29 from the single projector 231.

Figure 13:
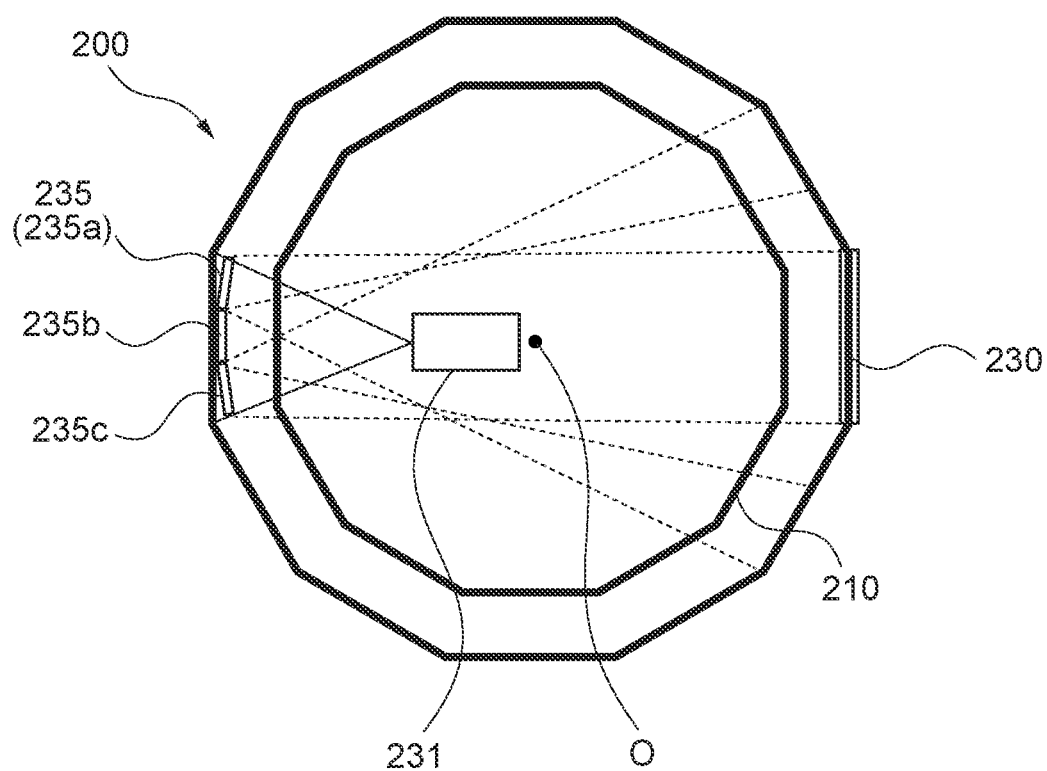
FIG. 13 A schematic diagram showing an example of division and projection.

FIG. 13 is a schematic diagram showing an example of division and projection. In the example shown in FIG. 13, three dividing mirrors 235a to 235c that divide an image projected by the projector 231 are used. For example, the image projected by the projector 231 is divided by each of the dividing mirrors 235a to 235c and divided into three directions as divided images and enlarged and projected. In this case, the respective dividing mirrors 235a to 235c can be considered as light-emitting points onto which the divided images are projected. It should be noted that the number of dividing mirrors 235 is not limited. The use of the dividing mirrors 235 can reduce the number of projectors 231, which can reduce the apparatus cost.

Figure 14:
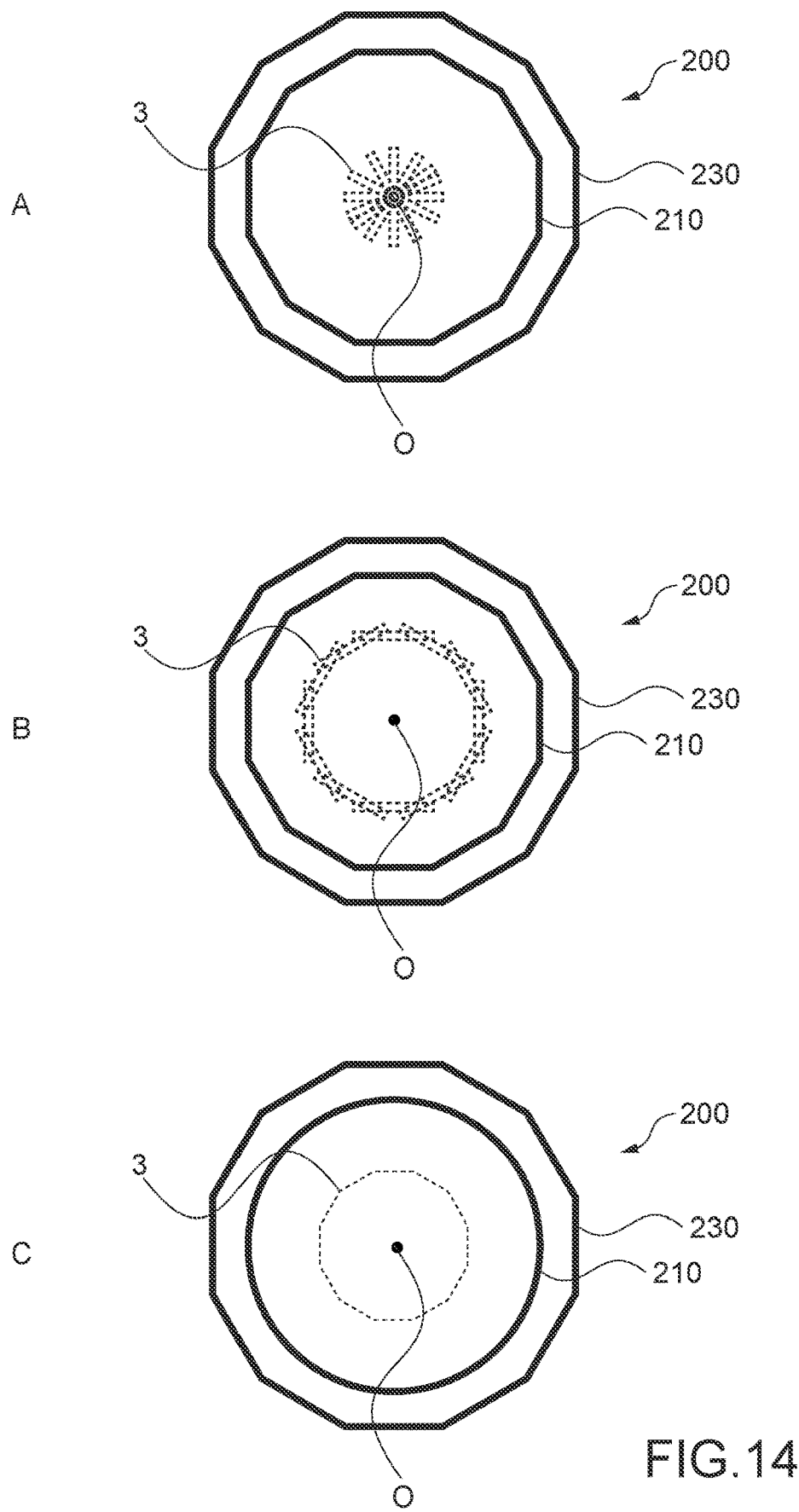
FIG. 14 A schematic diagram showing examples of display positions of virtual images in the image display apparatus.

FIG. 14 is a schematic diagram showing examples of the display positions of the virtual images 1 in the image display apparatus 200. FIG. 14A to FIG. 14C schematically show examples of the display positions of the virtual images 1 of the viewpoint images 4 displayed by the multi-viewpoint video source 211 for multi-screen. For example, as shown in FIG. 14A, the virtual images 1 of the plurality of viewpoint images 4 are displayed such that center lines of virtual image planes of the virtual images 3 overlap each other. Here, the center lines of the virtual image planes 3 are center lines parallel to the vertical direction (center axis O). Typically, the center lines of the respective virtual image plane 3 are displayed to coincide with the center axis O. Accordingly, it is possible to perform high-quality stereoscopic display in the entire periphery of the center axis O without shifting the position of the display target 5.

In the example shown in FIG. 14B, the virtual images 1 of the plurality of viewpoint images 4 are displayed such that the virtual image planes 3 partially overlap each other. The centers of the virtual images 1 do not necessarily need to coincide with each other and the virtual images 1 may be partially overlap each other. In that case, the multi-viewpoint video source 211 (real-image screens 230) can be made closer to the virtual-image screens 210, and therefore the apparatus size can be reduced. It should be noted that the image display apparatus 200 is capable of displaying the virtual image 1 such that the image of the display target 5 is observed in front of and behind the virtual image plane 3. Thus, even in a case where the virtual image planes 3 do not overlap each other at the center axis O, virtual-image display can be performed by using the center axis O as the basis by displaying the virtual image 1 on the deep side.

In the example shown in FIG. 14C, the virtual images 1 of the plurality of viewpoint images 4 are displayed such that the virtual image planes 3 are in contact with each other. Accordingly, the distance between the real-image screen 230 and the virtual-image screen 210 can be sufficiently reduced, and for example, a substantially tube-type image display apparatus or the like having small steps at the side surface can be realized.

Figure 15:
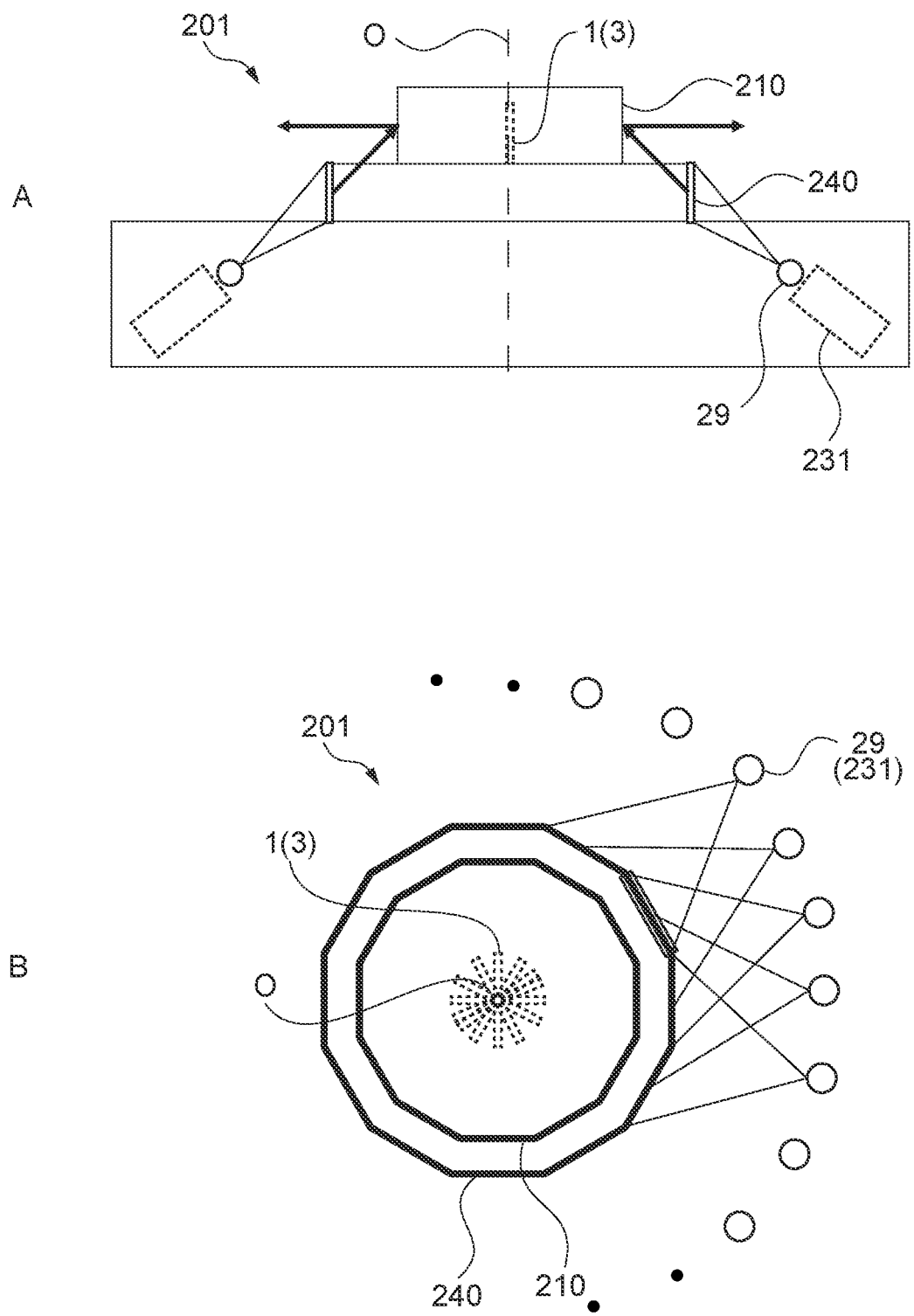
FIG. 15 A schematic diagram showing another configuration example of the image display apparatus.

FIG. 15 is a schematic diagram showing another configuration example of the image display apparatus. In an image display apparatus 201 shown in FIG. 15, transmission-type real-image screens 240 are used instead of the reflection-type real-image screens. FIG. 15A and FIG. 15B are a cross-sectional view and a top view of the image display apparatus 201 on which transmission-type real-image screens 240 are mounted. In the example shown in FIG. 15A, the projectors 231 are arranged outside the real-image screens 240 and images are directly projected from the respective projectors 231. Moreover, by providing the projectors 231 outside the real-image screens 240 as shown in FIG. 15B, the degree of freedom in arranging the projectors 231 is improved, and the configuration in which the single projector 231 projects images onto the plurality of real-image screens 240 can be easily realized.

Third Embodiment

Figure 16:
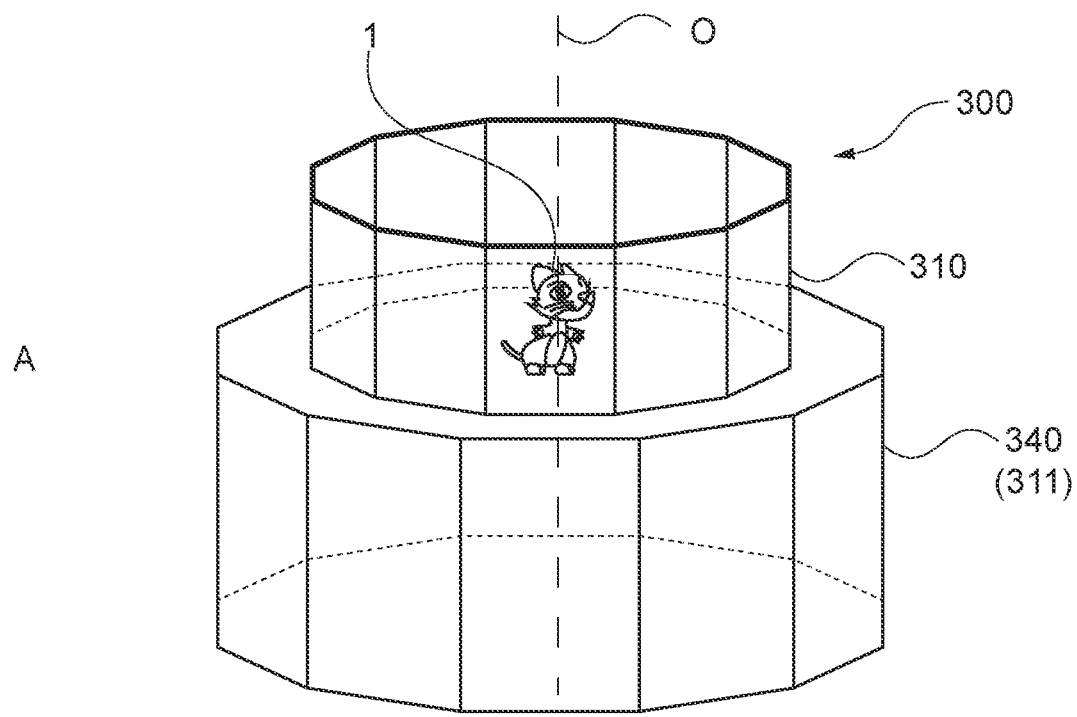
FIG. 16 A schematic diagram showing a configuration example of an image display apparatus according to a third embodiment.
Figure 16:
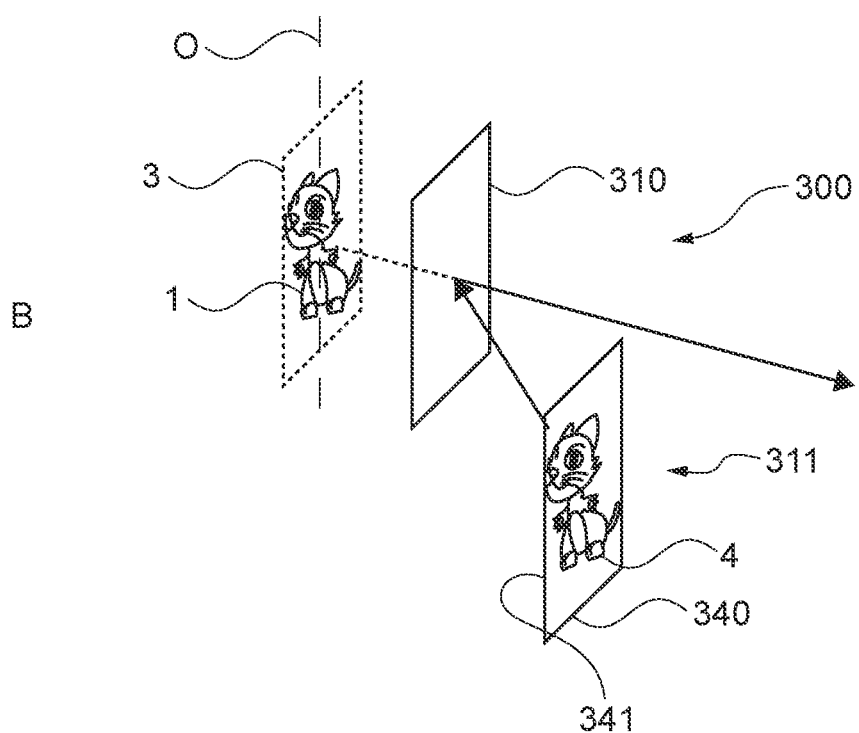
Figure 17:
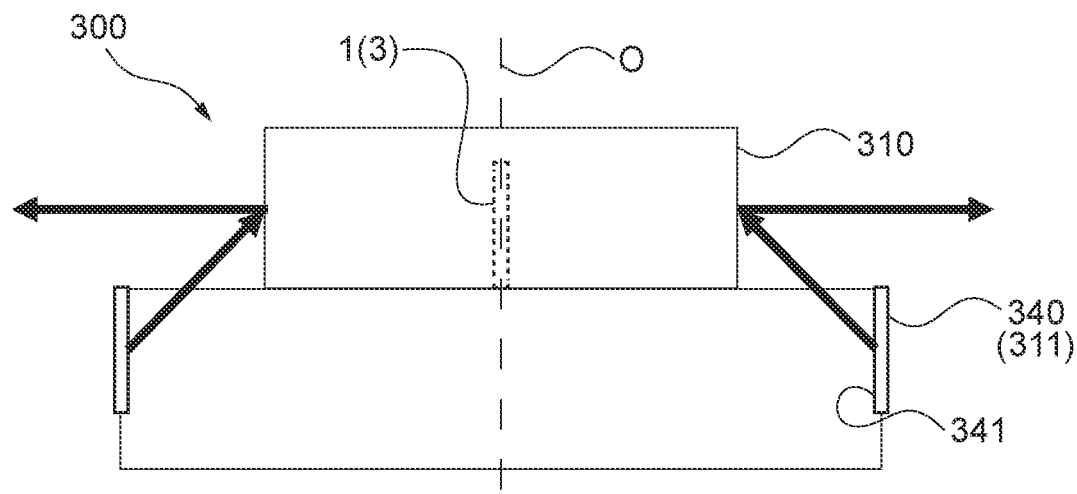
FIG. 17 A side view of the image display apparatus shown in FIG. 16.
Figure 18:
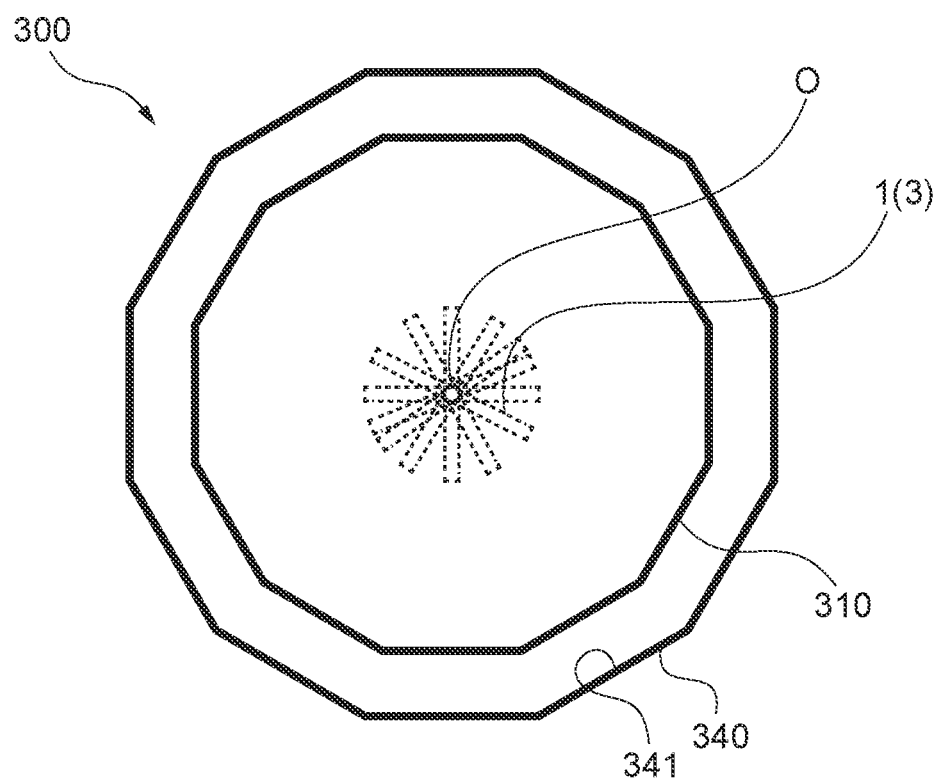
FIG. 18 A top view of the image display apparatus shown in FIG. 16.

FIG. 16 is a schematic diagram showing a configuration example of an image display apparatus according to a third embodiment. FIG. 16A is a perspective view of an image display apparatus 300 and FIG. 16B is a schematic diagram showing an internal configuration example of the image display apparatus 300. FIGS. 17 and 18 are a side view and a top view of the image display apparatus 300 shown in FIG. 16. In this embodiment, an all-around display is configured by using direct-view three-dimensional displays 340.

The image display apparatus 300 includes a plurality of virtual-image screens 310 and a multi-viewpoint video source 311 constituted by the plurality of three-dimensional displays 340. Each virtual-image screen 310 is, for example, configured to be similar to the virtual-image screens 210 of the image display apparatus 200 described above with reference to FIG. 10 and the like. That is, the virtual-image screens 310 are reflection-type HOEs and are arranged to cover the entire periphery of the center axis O.

The three-dimensional displays 340 are direct-view-type displays capable of displaying stereoscopic images without using dedicated eyeglasses and the like. The three-dimensional displays 340 include image display surfaces 341 that display stereoscopic images. In general, the direct-view three-dimensional display displays a stereoscopic image by displaying a plurality of viewpoint images 4 in a plurality of display directions. Thus, in this embodiment, the image display surfaces 341 of the direct-view three-dimensional displays 340 are display surfaces that display the viewpoint images 4. Each of the three-dimensional displays 340 is arranged with the image display surface 341 facing the corresponding virtual-image screen 310. As shown in FIGS. 16 to 18, it can be said that the image display apparatus 300 has a configuration obtained by replacing the real-image screens 230 of the image display apparatus 200 shown in FIG. 10 and the like with the three-dimensional displays 340.

The three-dimensional displays 340 display the plurality of viewpoint images 4 by any one method of a lenticular lens method, a lens array method, and a parallax barrier method. The lenticular lens method is a method of displaying images in mutually different directions by using a lenticular lens that disperses light in the horizontal direction. By using the lenticular lens method, a bright viewpoint image 4 can be displayed as compared with the parallax barrier method and the like. The lens array method is a method of dispersing light in the perpendicular and horizontal directions and displaying the viewpoint image 4 by using the micro-lens array. The use of the lens array method can achieve multiple viewpoints in the vertical direction, and can improve the expression of the sense of reality. The parallax barrier method is a method of displaying the viewpoint image 4 by using a parallax barrier or the like that selectively blocks light of each pixel and can realize the angle of the field of view wider as compared to the other methods.

With these methods, a flat panel display such as a liquid crystal display (LCD) displays an original image of the viewpoint image 4. It is desirable that the light source used as the back light of the display be a laser light source. It should be noted that in a case where the back light that utilizes the LED light source is used, narrowing the wavelength width through the wavelength filter or the like can reduce image blurring and color deviation due to the color dispersion on the virtual-image screens 310 (HOEs). In addition, an arbitrary method capable of stereoscopic display with bare eyes may be used. It should be noted that the three-dimensional displays 340 do not necessarily need display the viewpoint image 4 at the angular pitch that makes stereoscopic viewing possible. For example, a multi-viewpoint display that displays viewpoint images at a level that does not cause a binocular parallax by using these methods may be used.

As shown in FIGS. 17 and 18, the image display apparatus 300 is constituted by a columnar-type multi-screen (virtual-image screens 310) and a columnar-type multi-screen display (three-dimensional apparatus) arranged around it. By using the direct-view three-dimensional display 340 as the multi-viewpoint video source 311 in this manner, the entire apparatus size can be reduced.

Fourth Embodiment

Figure 19:
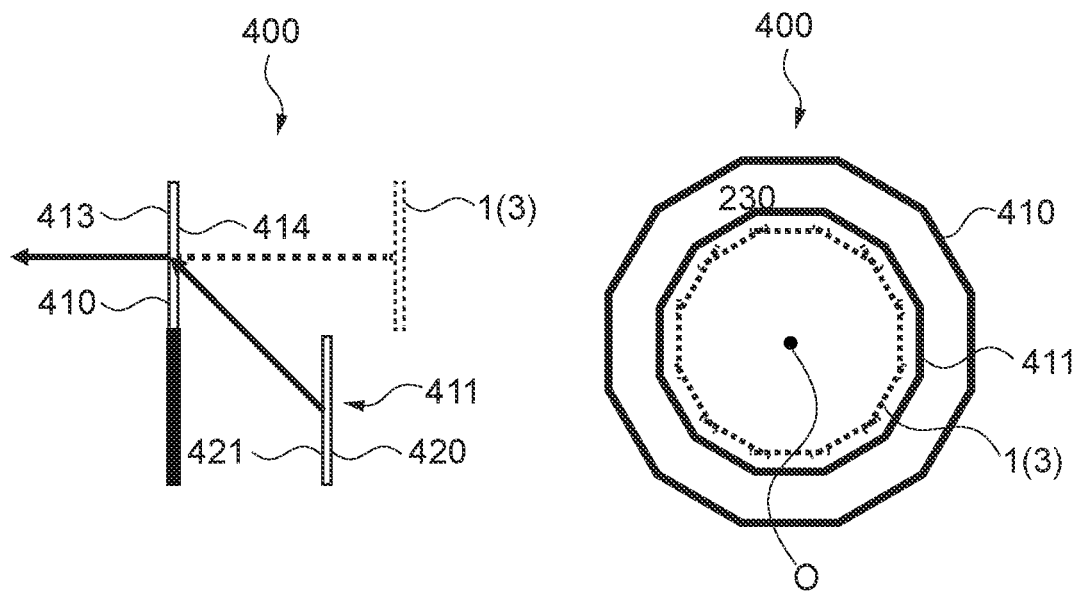
FIG. 19 A schematic diagram showing a configuration example of an image display apparatus according to a fourth embodiment.

FIG. 19 is a schematic diagram showing a configuration example of an image display apparatus according to a fourth embodiment. The pictures on the left side and the right side of FIG. 19 are a cross-sectional view and a top view of an image display apparatus 400. In the image display apparatus 400, transmission-type holographic optical elements (transmission-type HOEs) are used as virtual-image screens 410.

The transmission-type HOE is configured to diffract and transmit light entering the transmission-type HOE within a specific angle range and transmit light entering the transmission-type HOE within the other angle range. For example, light entering the transmission-type HOE within the specific angle range passes through the HOE main body and is emitted from the surface on a side opposite to the surface that the light has entered, at an angle of emission depending on the angle of incidence. Moreover, the light entering the transmission-type HOE at the angle of incidence other than the specific angle range is less likely to be diffracted by the interference fringes and passes through the transmission-type HOE.

As shown in FIG. 19, the plurality of virtual-image screens 410 is arranged to cover the entire periphery of the center axis O and configures a columnar multi-screen. In FIG. 19, a viewpoint image 4 is projected onto a back surface 414 of the virtual-image screen 410 obliquely from below. Light that configures the viewpoint image 4 projected onto the back surface 414 is emitted in the horizontal direction toward a surface 413 of the virtual-image screen 410. As a result, the user who observes the virtual-image screen 410 observes a virtual image 1 of the viewpoint image 4 in the extension line of the optical path emitted toward the surface 413, the extension line being extended toward the back surface 414. It should be noted that the image display apparatus 400 is configured such that the virtual image plane 3 that forms the virtual image 1 of each viewpoint image 4 intersects with the center axis O.

It can be said that as described above, the virtual-image screen 410 is a transmission-type mirror (transmission-type mirror HOE) that transmits an image and displays it as a virtual image. In the example shown in FIG. 19, the virtual-image screen 410 configured as a transmission-type plane mirror is used. It should be noted that it is also possible to configure the virtual-image screen 410 as a transmission-type curved mirror obtained by providing the HOE with a lens function (see FIG. 22).

The virtual-image screen 410 is configured by using a single transmission-type HOE. Alternatively, the virtual-image screen 410 may be configured by bonding two reflection-type HOEs. In this case, transmission can be realized by two diffraction reflections. By configuring the virtual-image screen 410 as a transmission-type, for example, it is possible to place a multi-viewpoint video source 411 inside the apparatus with respect to on the virtual-image screen 410, and the apparatus size can be reduced. It should be noted that the virtual-image screens 410 may be arranged to partially cover the periphery of the center axis O.

The multi-viewpoint video source 411 includes a plurality of multi-view displays 420. The multi-view displays 420 are arranged to cover the entire periphery of the center axis O and configure a columnar multi-screen display. Moreover, as described above, the virtual-image screens 410 are transmissive. Thus, the multi-view display 420 needs to, for example, project a viewpoint image 4 onto the back surface 414 of the virtual-image screen 410 obliquely from below. Therefore, in the image display apparatus 400, the multi-view displays 420 are arranged at positions closer to the center axis O than the virtual-image screens 410. The real-image screens according to the multi-projector system or the direct-view three-dimensional displays described in the above embodiment can be used as the multi-view displays 420.

As shown in the illustration on the left side of FIG. 19, in a case where the transmission-type virtual-image screen 410 are used, the distance between the multi-view display 420 that is a video source and the virtual-image screen 410 is shorter, and therefore it can be difficult to display the virtual image 1 to overlap the center axis O. Even in such a case, the display target 5 can be displayed at multiple viewpoints by displaying the virtual images 1 viewed from respective directions such that the virtual images 1 are continuous with each other.

Figure 20:
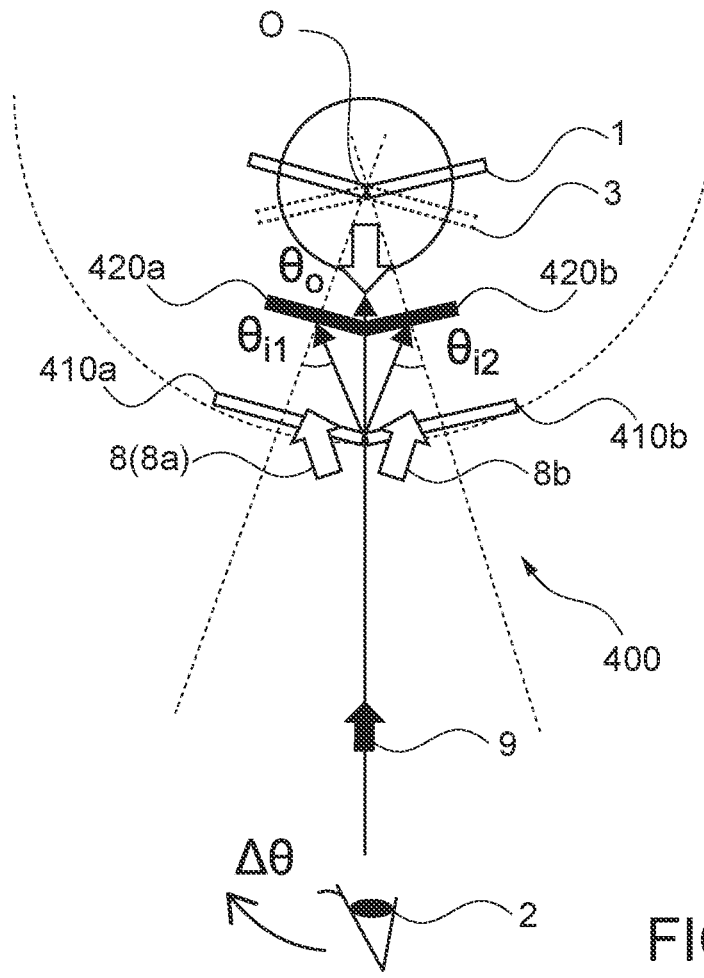
FIG. 20 A schematic diagram for describing a method of displaying viewpoint images projected onto transmission-type virtual-image screens.

FIG. 20 is a schematic diagram for describing a method of displaying the viewpoint images 4 projected onto the transmission-type virtual-image screens 410. In FIG. 20, directions (real-image observation directions 8) in which the user sees the multi-view displays 420 via the virtual-image screens 410 and directions extending toward the center axis from the user's viewpoint 2 are schematically shown as the hollow and solid arrows. In FIG. 20, it is assumed that the user observes virtual images in a virtual-image observation direction 9 passing through the boundary between virtual-image screens 410a and 410b adjacent to each other. Moreover, the direction (direction opposite to the virtual-image observation direction 9 in FIG. 20) extending toward the boundary from the center axis O is a starting-point direction that is a starting point when displaying the display target 5.

In this embodiment, the transmission-type virtual-image screens 410 are used. That is, the virtual-image screens 410 transmit the viewpoint images 4 projected from display surfaces 421 and displays the virtual images 1 of the viewpoint images 4. Thus, the viewpoint images 4 displayed on the display surfaces 421 is images displayed as the virtual images 1 as they are. In this case, a video control unit (not shown) displays, in the virtual-image observation direction 9, the viewpoint images 4 of the display target 5 as viewed from the real-image observation direction 8. Accordingly, it is possible to appropriately display the virtual images 1 of the display target 5.

The starting-point direction of the display target 5 (e.g., direction to observe the front of the display target 5 (virtual image)) is represented by an azimuthal angle using the center axis O as the basis. Here, it is assumed that the azimuthal angle in the starting-point direction is $\theta_0$ degrees. Thus, in FIG. 20, the virtual image 1 is observed from the viewpoint 2 at which the virtual-image observation direction 9 is the azimuthal angle of $\theta_0$. At this time, it is assumed that the angle to see the center of a multi-view display 420a on the left side as viewed from the user's viewpoint 2 is $\theta_{i1}$. Moreover, it is assumed that the angle to see the center of a multi-view display 420b on the right side as viewed from the user's viewpoint 2 is $\theta_{i2}$.

Here, the description will be given assuming that $\theta_{i1}$ and $\theta_{i2}$ are angles on the horizontal plane for the sake of description. For example, $\theta_{i1}$ ($\theta_{i2}$) is an angle formed by a straight line, which is obtained by projecting onto the horizontal plane the optical path extending toward the center of the multi-view display 420a (multi-view display 420b) via the virtual-image screen 410a (virtual-image screen 410b), and the normal line of the multi-view display 420a (multi-view display 420b). It can be said that these angles are angles representing the directions (real-image observation directions 8a and 8b) to see the respective multi-view displays 420a and 420b.

Here, it is assumed that the user's viewpoint 2 is moved by $\Delta\theta$ and the azimuthal angle in the virtual-image observation direction 9 is ($\theta_0+\Delta\theta$). That is, it is assumed that the viewpoint 2 is rotated in the counter-clockwise direction by $\Delta\theta$, using the center axis O as the basis. In this case, the angle $\theta_{i2}$ to see the multi-view display 420a is ($\theta_{i2}-\beta'(\theta)\times\Delta\theta$). Here, $\beta'(\theta)$ is a positive coefficient. In this case, $\theta_{i2}$ decreases due to the movement of the viewpoint 2 by $\Delta\theta$. It means that the direction to see the multi-view display 420a as viewed from the top surface is rotated in the counter-clockwise direction. Moreover, the angle $\theta_{i2}$ to see the multi-view display 420b is ($\theta_{i2}+\beta'(\theta)\times\Delta\theta$). Here, $\beta'(\theta)$ is a positive coefficient. In this case, $\theta_{i2}$ increases due to the movement of the viewpoint 2 by $\Delta\theta$. It means that the direction to see the multi-view display 420b as viewed from the top surface is rotated in the counter-clockwise direction.

By displaying the viewpoint images 4 of the display target 5 at $\theta_0+\Delta\theta$ degrees on the respective display surfaces 421 when seeing the display surfaces 421 of the multi-view displays 420 at the angle changed by $\Delta\theta$ in this manner, it is possible to cause the user to see the virtual images of the display target 5 as viewed therefrom. Moreover, in a case where the transmission-type virtual-image screens 410 are used, a direction in which the direction to see is rotated is opposite to that in the case where the reflection-type virtual-image screens 410 described above with reference to FIG. 7.

It should be noted that $\alpha'(\theta)$ and $\beta'(\theta)$ are coefficients associated with the amount of change of the angles ($\theta_{i1}$ and $\theta_{i2}$) to see each multi-view display and are parameters for correcting the influence (angle deviation or the like) of projection angle transformation, lens effects, HOE diffraction aberrations, and the like. In particular, in a case where a lens function to be described below is provided, it is conceivable that the light travelling direction greatly changes and in addition, the aberration occurs. By setting the coefficients to reduce these influences and correcting the amount of change, the virtual images 1 of the display target 5 can be correctly displayed.

Figure 21:
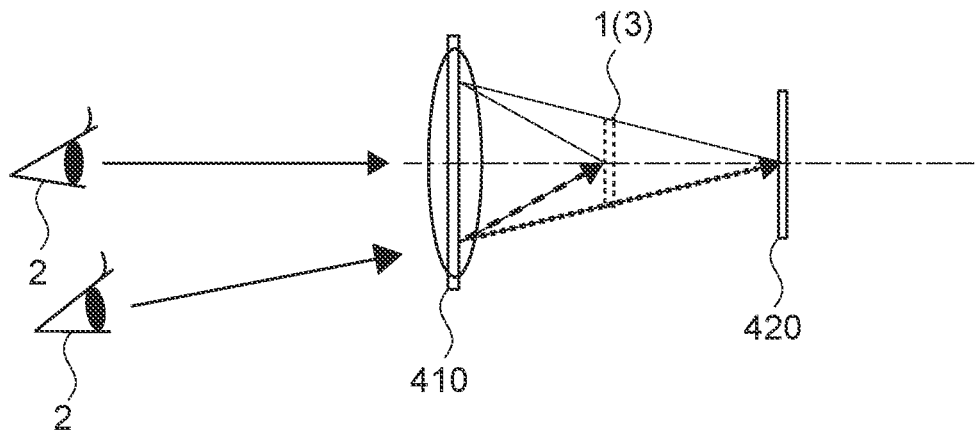
FIG. 21 A schematic diagram showing an example of a virtual image displayed by a transmission-type virtual-image screen having a lens function.

FIG. 21 is a schematic diagram showing an example of the virtual image displayed by the transmission-type virtual-image screen 410 having the lens function. In FIG. 21, it is assumed that the virtual image 1 is observed through the virtual-image screen 410. For example, by adding the lens function to the virtual-image screen 410, the display position of the virtual image 1 and the size of the virtual image 1 change. At that time, the orientation and the like of the optical path for displaying the virtual image are not changed at the viewpoint 2 directed to the center of the lens.

On the other hand, when the virtual image 1 is observed at an edge portion of the lens, a direction (coarse dotted line arrow) of viewing the virtual image 1 changes when the lens function is added. It should be noted that a direction (fine dotted line arrow) to see the multi-view display 420 is not changed even when the lens function is added. In this manner, the addition of the lens function changes the optical path of light that displays the virtual image 1 and various aberrations occur in some cases. The viewpoint image 4 is corrected as appropriate in order to suppress deformation and the like due to such angle change and aberrations.

Figure 22:
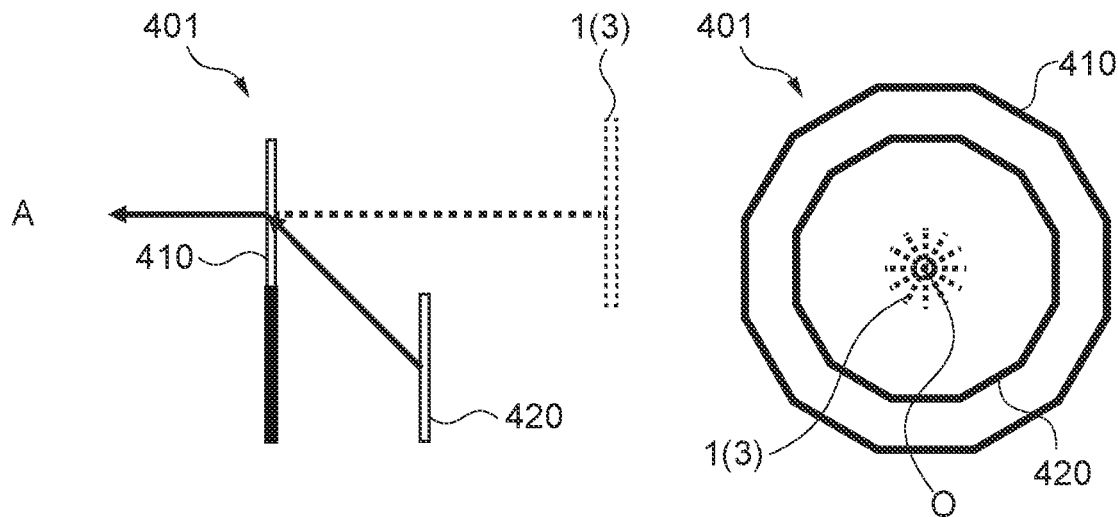
FIG. 22 A schematic diagram showing another configuration example of the image display apparatus.
Figure 22:
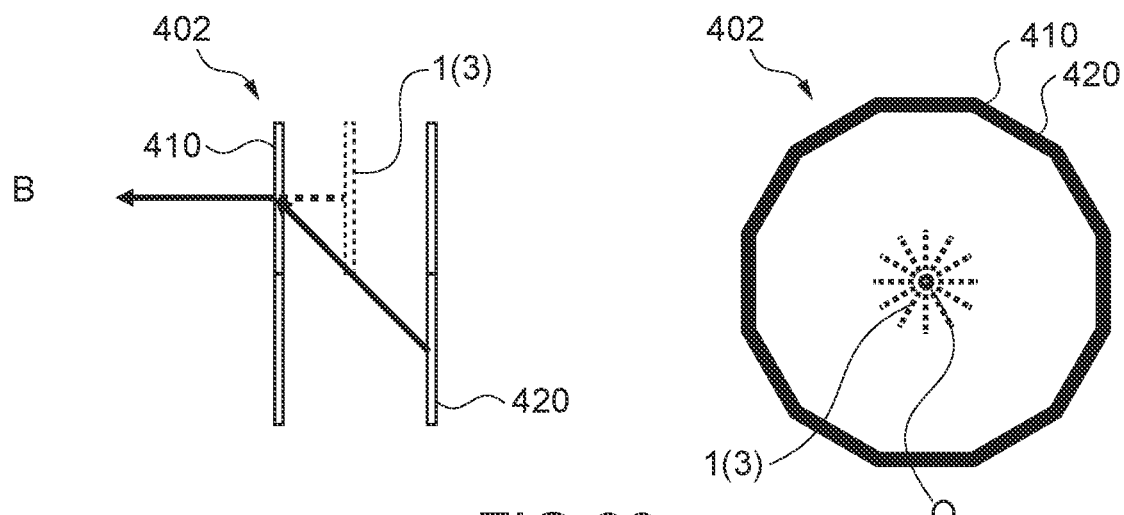

FIG. 22 is a schematic diagram showing another configuration example of the image display apparatus. An image display apparatus 401 shown in FIG. 22A shows a configuration in which the virtual-image screen 410 is provided with the lens function in the image display apparatus 400 shown in FIG. 19. With this configuration, the virtual images 1 can be displayed to overlap the center axis O by setting the display positions of the virtual images 1 at positions further from the virtual-image screen 410. By using the lens function in this manner, the display positions of the virtual images 1 can be adjusted as appropriate.

An image display apparatus 402 shown in FIG. 22B is configured such that the multi-screen configured by the virtual-image screens 410 and the multi-screen display configured by the multi-view displays 420 are internally provided in an identical cylinder. Moreover, the viewpoint image 4 is projected onto the virtual-image screen 410 from the multi-view display 420 arranged on an opposite side across the center axis O. Employing a configuration to project an image from the opposite side in this manner can increase the projection distance. Moreover, the tube-type image display apparatus 400 with no steps can be realized.

Fifth Embodiment

Figure 23:
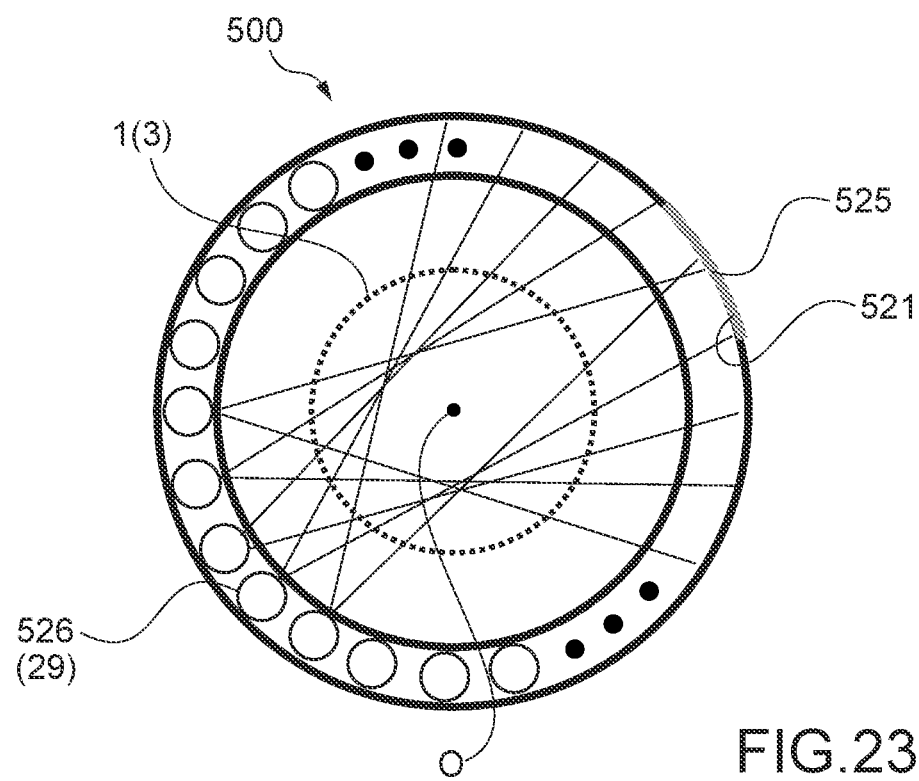
FIG. 23 A schematic diagram showing a configuration example of an image display apparatus according to a fifth embodiment.

FIG. 23 is a schematic diagram showing a configuration example of an image display apparatus according to a fifth embodiment. An image display apparatus 500 according to this embodiment is configured by using a virtual-image screen 510 having a curved surface shape.

The image display apparatus 500 includes a cylindrical virtual-image screen 510 and a cylindrical real-image screen 525 having a larger radius than that of the virtual-image screen 510. The virtual-image screen 510 and the real-image screen 525 are respectively arranged having the center axis O as the center. Typically, the real-image screen 525 is arranged below the virtual-image screen 510 not to block the display of virtual images 1. The virtual-image screen 510 and the real-image screen 525 are constituted by, for example, reflection-type HOEs.

Moreover, the image display apparatus 500 includes a plurality of projectors 526 that projects images onto the real-image screen 525. FIG. 23 shows each of light-emitting points 29 of the plurality of projectors 526. It can be said that the image display apparatus 500 has a configuration in which the multi-screen (virtual-image screen) and the multi-screen display (real-image screen) of the image display apparatus 200 described above with reference to FIGS. 10 to 12, for example, are formed in a cylindrical shape.

As shown in FIG. 23, the plurality of projectors 526 is arranged such that the light-emitting points 29 are arranged side by side on the circumference along the real-image screen 525. An image is projected from each light-emitting point 29 toward the real-image screen 525 on an opposite side across the center axis O. Accordingly, the plurality of projectors 526 projects images onto a display surface 521 inside the real-image screen 525 in mutually different directions, and the viewpoint image 4 can be displayed. The viewpoint image 4 displayed on the display surface 521 is projected onto the virtual-image screen 510. Moreover, a cylindrical virtual image plane 3 having the center axis O as the center is formed inside the virtual-image screen 510. The virtual image of the display target 5 is displayed on this virtual image plane 3.

In a case where the virtual-image screen 510 has a cylindrical shape, the virtual image plane 3 is continuous as shown in FIG. 23. Thus, the virtual-image screen 510 have no seams in the image display apparatus 500. Therefore, it is possible to display the virtual images of the display target 5 smoothly, and it provides an effect of sufficiently improving the sense of reality. Moreover, the maximum value of the angle to see the virtual-image screen 510 is smaller than that in a case where a columnar virtual-image screen 510 is used. Here, the angle to see the virtual-image screen 510 is, for example, an angle formed by a normal-line direction of a surface of the virtual-image screen 510 and a line-of-sight direction at an intersection point of the line-of-sight direction and the surface.

In the cylindrical shape, the angle to see the virtual-image screen 510 continuously changes along with the movement of the viewpoint 2. Therefore, when the viewpoint 2 is moved, luminance reduction, change, and the like, which easily occur due to switching between screens, do not occur. Accordingly, the situation where the luminance of the virtual image unnaturally changes is avoided and natural stereoscopic display can be realized. It should be noted that the same applies to a case where a transmission-type HOE is used as the virtual-image screen 510.

In the above description, the case where the real-image screen 525 also has a cylindrical shape has been described, though not limited thereto. For example, the real-image screen 525 may have a columnar shape. On the contrary, the real-image screen 525 may have a cylindrical shape and the virtual-image screen 510 may have a columnar shape. Thus, in this embodiment, at least one of the virtual-image screen 510 or the real-image screen 525 (display surface) has a curved surface shape.

Figure 24:
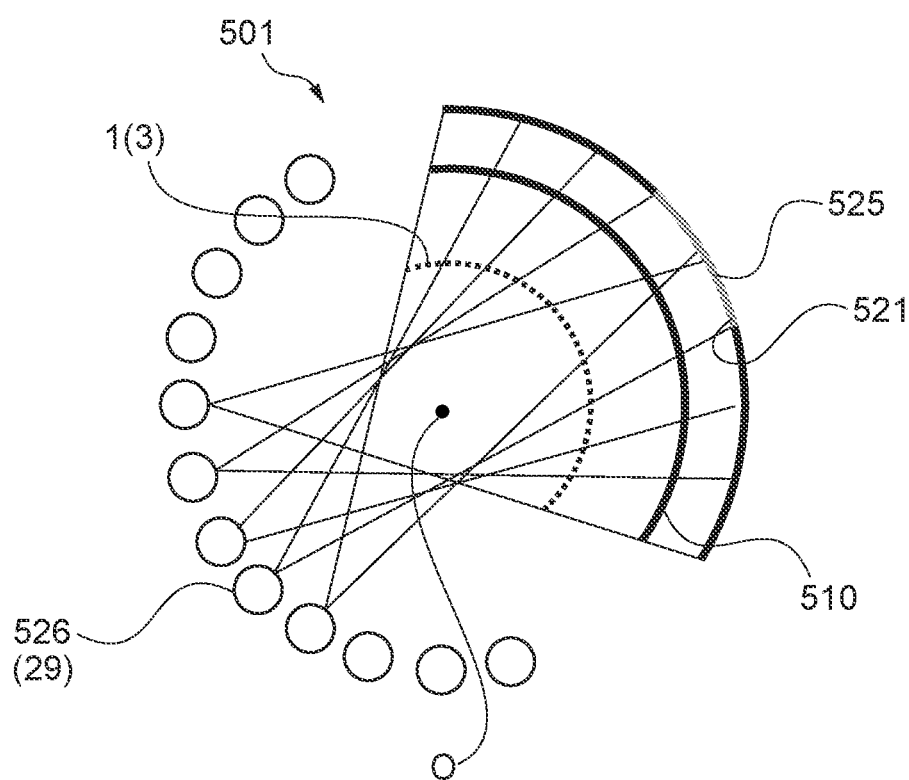
FIG. 24 A schematic diagram showing another configuration example of the image display apparatus.

FIG. 24 is a schematic diagram showing another configuration example of the image display apparatus. An image display apparatus 501 shown in FIG. 24 includes a virtual-image screen 510 and a real-image screen 525, which have a circular arc-shape, and a plurality of projectors 526 that projects images toward the real-image screen 525. This configuration is, for example, a configuration obtained by partially cutting out the image display apparatus 500 shown in FIG. 23. In this manner, the curved surface-shaped virtual-image screen 510 (real-image screen 525) may be arranged to cover a part of the periphery of the center axis O. In addition, the specific configuration of the curved surface-shaped screen is not limited. For example, a virtual-image screen 510 having a horizontal cross-section that is an arbitrary curve line such as an elliptical shape, a hyperbola, and a parabola may be used.

Sixth Embodiment

Figure 25:
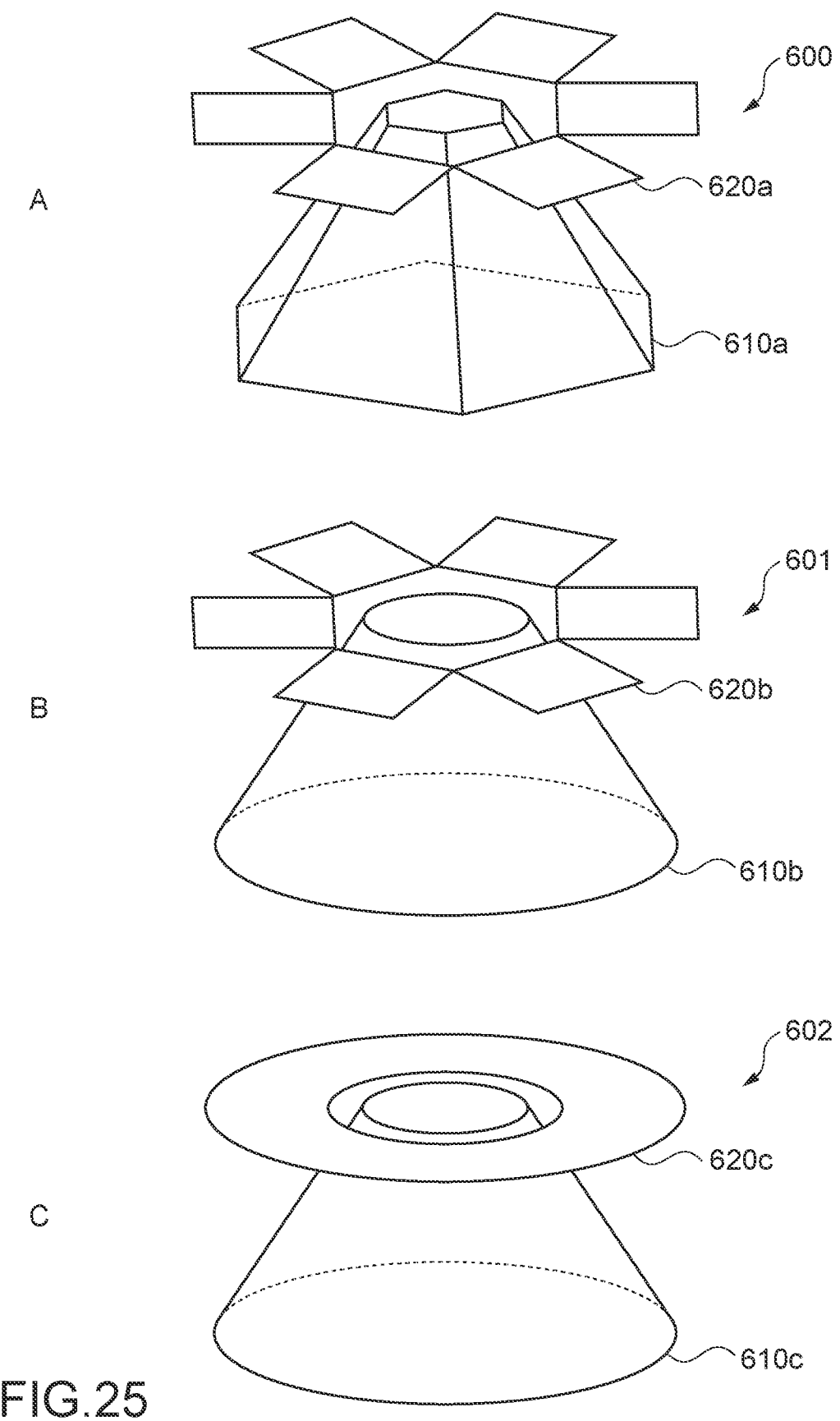
FIG. 25 A schematic diagram showing a configuration example of an image display apparatus according to a sixth embodiment.

FIG. 25 is a schematic diagram showing a configuration example of an image display apparatus according to a sixth embodiment. In this embodiment, a half mirror is used as a virtual-image screen 610. In general, light that enters the half mirror is specularly reflected at an emission angle equal to the incident angle. Therefore, for example, in a case of causing light to be emitted in the horizontal direction (displaying a virtual image), the light is made incident upon the mirror surface inclined with respect to the vertical direction by 45 degrees.

In the image display apparatus 600 shown in FIG. 25A, a plurality of virtual-image screens 610a forms a polygonal pyramidal multi-screen placed with the vertex side directed upward. Moreover, a plurality of multi-view displays 620a that displays viewpoint images 4 toward the respective surfaces is respectively arranged above the multi-screen. In an image display apparatus 601 shown in FIG. 25B, a conical virtual-image screen 610b placed with the vertex side directed upward is used. A plurality of multi-view displays 620b is respectively arranged above the virtual-image screens 610a as in FIG. 25A. Accordingly, the virtual images of the display target 5 can be displayed toward the outer peripheries of the virtual-image screens 610a and 610b.

In an image display apparatus 602 shown in FIG. 25C, a multi-view display 620c capable of displaying a viewpoint image 4 in a ring-shape is arranged above a conical virtual-image screen 610c placed with the vertex side directed upward. By using the ring-like multi-view display 620c in this manner, a virtual image 1 can be displayed continuously over the entire periphery. Accordingly, for example, it is possible to avoid the situation where the display of the virtual image 1 is partially interrupted because of separated multi-view displays 620.

At least two features of the features according to the present technology which have been described above may be combined. That is, the various features described in the respective embodiments may be arbitrarily combined across the respective embodiments. Moreover, the above-mentioned various effects are merely exemplary and not limitative, and other effects may be provided.

In the present disclosure, it is assumed that "the same", "equal", "orthogonal", and the like are concepts including "substantially the same", "substantially equal", "substantially orthogonal", and the like. For example, states included in a predetermined range (e.g., ±10% range) using "completely the same", "completely equal", "completely orthogonal", and the like as the basis are also included.

It should be noted that the present technology can also take the following configurations.

(1) An image display apparatus, including:
  one or more virtual-image screens that are arranged to cover at least a part of a periphery of a predetermined axis, display a virtual image of a projected image by using the predetermined axis as a basis, and are transparent;
  a display section having one or more display surfaces that display a plurality of viewpoint images in mutually different directions and project the plurality of displayed viewpoint images onto the one or more virtual-image screens, respectively, the plurality of viewpoint images being images of a display target as viewed from mutually different directions; and
  a display control unit that displays, in a first direction to see the display surface from an observation point around the virtual-image screen via the virtual-image screen, the viewpoint image that is a virtual image of the display target that is visible from a second direction extending toward the predetermined axis from the observation point.

(2) The image display apparatus according to (1), in which
  the plurality of viewpoint images is images of the display target as viewed from a direction shifted by a predetermined angular pitch, and
  the display control unit displays the viewpoint image such that the virtual image of the display target is switched at the predetermined angular pitch as viewed from the observation point in accordance with movement of the observation point.

(3) The image display apparatus according to (1) or (2), in which
  the virtual-image screen reflects the viewpoint image projected from the display surface and displays a virtual image of the viewpoint image, and
  the display control unit displays, in the first direction, the viewpoint image obtained by flipping horizontally an image of the display target as viewed from the second direction.

(4) The image display apparatus according to (1) or (2), in which
  the virtual-image screen transmits the viewpoint image projected from the display surface and displays a virtual image of the viewpoint image, and
  the display control unit displays, in the first direction, the viewpoint image of the display target as viewed from the second direction.

(5) The image display apparatus according to any one of (1) to (4), in which
  the one or more virtual-image screens include a plurality of virtual-image screens and configures a multi-screen by using the predetermined axis as a basis.

(6) The image display apparatus according to any one of (1) to (5), in which
  the virtual-image screen is either one of a diffractive optical element and a half mirror.

(7) The image display apparatus according to any one of (1) to (6), in which
  the virtual-image screen is either one of a reflection-type holographic optical element and a transmission-type holographic optical element.

(8) The image display apparatus according to any one of (1) to (7), in which
  the one or more virtual-image screens are arranged to cover the entire periphery of the predetermined axis.

(9) The image display apparatus according to any one of (1) to (8), in which
  the one or more display surfaces are arranged not to block a virtual image displayed by the one or more virtual-image screens.

(10) The image display apparatus according to any one of (1) to (9), in which
  the one or more display surfaces include a plurality of display surfaces and configure a multi-screen display by using the predetermined axis as a basis.

(11) The image display apparatus according to any one of (1) to (10), in which
  virtual images of the plurality of viewpoint images are displayed such that center lines of virtual image planes of the virtual images overlap each other.

(12) The image display apparatus according to any one of (1) to (10), in which
  virtual images of the plurality of viewpoint images are displayed such that virtual image planes of the virtual images partially overlap each other.

(13) The image display apparatus according to any one of (1) to (10), in which
  virtual images of the plurality of viewpoint images are displayed such that virtual image planes of the virtual images are in contact with each other.

(14) The image display apparatus according to any one of (1) to (13), in which
  at least one of the virtual-image screen or the display surface has a curved surface shape.

(15) The image display apparatus according to any one of (1) to (14), in which
  the display surface is an image display surface of an anisotropic diffusion screen, and
  the display section has a plurality of projection units that projects images onto the anisotropic diffusion screen from mutually different directions.

(16) The image display apparatus according to any one of (1) to (15), in which
  the display surface is an image display surface of a direct-view three-dimensional display.

(17) The image display apparatus according to (16), in which
  the three-dimensional display displays the plurality of viewpoint images by any one method of a lenticular lens method, a lens array method, and a parallax barrier method.

REFERENCE SIGNS LIST

1, 1a, 1b virtual image
2 viewpoint
3 virtual image plane
4, 4a to 4c viewpoint image
5 display target
8, fa, 8b real-image observation direction
9 virtual-image observation direction
10, 210, 310, 410, 510, 610 virtual-image screen
11, 211, 311, 411 multi-viewpoint video source
12 video control unit
20, 420, 620 multi-view display
21, 221, 421, 521 display surface
25, 230, 525 real-image screen
26, 231, 526 projector
28, 341 image display surface
100, 200, 201, 300, 400, 401, 402, 500, 501, 600, 601, 602 image display apparatus
340 three-dimensional display

What is claimed is:

1. An image display apparatus, comprising:
one or more virtual-image screens that are arranged to cover at least a part of a periphery of a predetermined axis, display a virtual image of a projected image by using the predetermined axis as a basis, and are transparent;
a display section having one or more display surfaces that display a plurality of viewpoint images in mutually different directions and project the plurality of displayed viewpoint images onto the one or more virtual-image screens, respectively, the plurality of viewpoint images being images of a display target as viewed from mutually different directions; and
a display control unit that displays, in a first direction to see the display surface from an observation point around the virtual-image screen via the virtual-image screen, the viewpoint image that is a virtual image of the display target that is visible from a second direction extending toward the predetermined axis from the observation point.

2. The image display apparatus according to claim 1, wherein
the plurality of viewpoint images is images of the display target as viewed from a direction shifted by a predetermined angular pitch, and
the display control unit displays the viewpoint image such that the virtual image of the display target is switched at the predetermined angular pitch as viewed from the observation point in accordance with movement of the observation point.

3. The image display apparatus according to claim 1, wherein
the virtual-image screen reflects the viewpoint image projected from the display surface and displays a virtual image of the viewpoint image, and
the display control unit displays, in the first direction, the viewpoint image obtained by flipping horizontally an image of the display target as viewed from the second direction.

4. The image display apparatus according to claim 1, wherein
the virtual-image screen transmits the viewpoint image projected from the display surface and displays a virtual image of the viewpoint image, and
the display control unit displays, in the first direction, the viewpoint image of the display target as viewed from the second direction.

5. The image display apparatus according to claim 1, wherein
the one or more virtual-image screens include a plurality of virtual-image screens and configures a multi-screen by using the predetermined axis as a basis.

6. The image display apparatus according to claim 1, wherein
the virtual-image screen is either one of a diffractive optical element and a half mirror.

7. The image display apparatus according to claim 1, wherein
the virtual-image screen is either one of a reflection-type holographic optical element and a transmission-type holographic optical element.

8. The image display apparatus according to claim 1, wherein
the one or more virtual-image screens are arranged to cover the entire periphery of the predetermined axis.

9. The image display apparatus according to claim 1, wherein
the one or more display surfaces are arranged not to block a virtual image displayed by the one or more virtual-image screens.

10. The image display apparatus according to claim 1, wherein
the one or more display surfaces include a plurality of display surfaces and configure a multi-screen display by using the predetermined axis as a basis.

11. The image display apparatus according to claim 1, wherein
virtual images of the plurality of viewpoint images are displayed such that center lines of virtual image planes of the virtual images overlap each other.

12. The image display apparatus according to claim 1, wherein
virtual images of the plurality of viewpoint images are displayed such that virtual image planes of the virtual images partially overlap each other.

13. The image display apparatus according to claim 1, wherein
virtual images of the plurality of viewpoint images are displayed such that virtual image planes of the virtual images are in contact with each other.

14. The image display apparatus according to claim 1, wherein
at least one of the virtual-image screen or the display surface has a curved surface shape.

15. The image display apparatus according to claim 1, wherein
the display surface is an image display surface of an anisotropic diffusion screen, and
the display section has a plurality of projection units that projects images onto the anisotropic diffusion screen from mutually different directions.

16. The image display apparatus according to claim 1, wherein
the display surface is an image display surface of a direct-view three-dimensional display.

17. The image display apparatus according to claim 16, wherein
the three-dimensional display displays the plurality of viewpoint images by any one method of a lenticular lens method, a lens array method, and a parallax barrier method.

* * * * *